United States Patent
Bathiche et al.

(10) Patent No.: US 11,010,601 B2
(45) Date of Patent: May 18, 2021

(54) INTELLIGENT ASSISTANT DEVICE COMMUNICATING NON-VERBAL CUES

(71) Applicant: Microsoft Technology Licensing, LLC, Redmond, WA (US)

(72) Inventors: Steven Nabil Bathiche, Redmond, WA (US); Vivek Pradeep, Redmond, WA (US); Alexander Norman Bennett, Redmond, WA (US); Daniel Gordon O'Neil, Redmond, WA (US); Anthony Christian Reed, Redmond, WA (US); Krzysztof Jan Luchowiec, Redmond, WA (US); Tsitsi Isabel Kolawole, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/936,076

(22) Filed: Mar. 26, 2018

(65) Prior Publication Data
US 2018/0232571 A1 Aug. 16, 2018

Related U.S. Application Data

(63) Continuation-in-part of application No. 15/682,407, filed on Aug. 21, 2017, now Pat. No. 10,628,714.
(Continued)

(51) Int. Cl.
*G01C 21/00* (2006.01)
*G06K 9/00* (2006.01)
(Continued)

(52) U.S. Cl.
CPC ......... *G06K 9/00369* (2013.01); *G06F 3/167* (2013.01); *G10L 15/22* (2013.01);
(Continued)

(58) Field of Classification Search
CPC ..... G06K 9/00369; G06F 3/167; G10L 15/22; G10L 15/24; G10L 2015/227; H05B 47/105; Y02B 20/48; G01C 21/00
(Continued)

(56) References Cited

U.S. PATENT DOCUMENTS

| 6,067,673 A | 5/2000 | Paese et al. |
| 6,119,088 A | 9/2000 | Ciluffo |

(Continued)

FOREIGN PATENT DOCUMENTS

| CN | 102760434 A | 10/2012 |
| CN | 103209030 A | 7/2013 |

(Continued)

OTHER PUBLICATIONS

"Final Office Action Issued in U.S. Appl. No. 15/646,871", dated Apr. 19, 2019, 22 Pages.
(Continued)

*Primary Examiner* — Shardul D Patel
(74) *Attorney, Agent, or Firm* — Alleman Hall Creasman & Tuttle LLP

(57) ABSTRACT

An intelligent assistant device is configured to communicate non-verbal cues. Image data indicating presence of a human is received from one or more cameras of the device. In response, one or more components of the device are actuated to non-verbally communicate the presence of the human. Data indicating context information of the human is received from one or more of the sensors. Using at least this data one or more contexts of the human are determined, and one or more components of the device are actuated to non-verbally communicate the one or more contexts of the human.

20 Claims, 17 Drawing Sheets

Related U.S. Application Data

(60) Provisional application No. 62/597,297, filed on Dec. 11, 2017, provisional application No. 62/482,165, filed on Apr. 5, 2017, provisional application No. 62/459,020, filed on Feb. 14, 2017.

(51) Int. Cl.
  *G10L 15/22* (2006.01)
  *G10L 15/24* (2013.01)
  *G06F 3/16* (2006.01)
  *H05B 47/105* (2020.01)

(52) U.S. Cl.
  CPC ........ *G10L 15/24* (2013.01); *G10L 2015/227* (2013.01); *H05B 47/105* (2020.01); *Y02B 20/40* (2013.01)

(58) Field of Classification Search
  USPC .......... 701/495; 382/103; 348/148; 434/219, 434/323; 901/1, 47; 700/253
  See application file for complete search history.

(56) References Cited

U.S. PATENT DOCUMENTS

| | | |
|---|---|---|
| 6,332,122 B1 | 12/2001 | Ortega et al. |
| 6,442,524 B1 | 8/2002 | Ecker et al. |
| 6,477,500 B2 | 11/2002 | Maes |
| 6,496,799 B1 | 12/2002 | Pickering |
| 6,574,601 B1 | 6/2003 | Brown et al. |
| 6,727,925 B1 | 4/2004 | Bourdelais |
| 6,728,679 B1 | 4/2004 | Strubbe et al. |
| 6,816,730 B2 | 11/2004 | Davies et al. |
| 6,873,953 B1 | 3/2005 | Lennig |
| 7,019,749 B2 | 3/2006 | Guo et al. |
| 7,050,110 B1 | 5/2006 | Lienhart et al. |
| 7,330,566 B2 | 2/2008 | Cutler |
| 7,475,010 B2 | 1/2009 | Chao |
| 7,610,365 B1 | 10/2009 | Kraft et al. |
| 7,716,056 B2 | 5/2010 | Weng et al. |
| 7,783,486 B2 | 8/2010 | Sturges et al. |
| 7,803,050 B2 | 9/2010 | Mao et al. |
| 8,139,945 B1 | 3/2012 | Amir et al. |
| 8,165,087 B2 | 4/2012 | Panabaker |
| 8,170,875 B2 | 5/2012 | Hetherington et al. |
| 8,213,689 B2 | 7/2012 | Yagnik et al. |
| 8,265,252 B2 | 9/2012 | Ducheneaut et al. |
| 8,326,627 B2 | 12/2012 | Kennewick et al. |
| 8,340,975 B1 | 12/2012 | Rosenberger |
| 8,374,879 B2 | 2/2013 | Falcon et al. |
| 8,453,402 B2 | 6/2013 | Huang |
| 8,457,959 B2 | 6/2013 | Kaiser |
| 8,543,402 B1 | 9/2013 | Ma |
| 8,639,762 B2 | 1/2014 | Rasmussen et al. |
| 8,644,842 B2 | 2/2014 | Arrasvuori et al. |
| 8,712,758 B2 | 4/2014 | Crouch et al. |
| 8,752,145 B1 | 6/2014 | Dotan et al. |
| 8,762,150 B2 | 6/2014 | Edgington et al. |
| 8,762,156 B2 | 6/2014 | Chen |
| 8,779,965 B2 | 7/2014 | Sentelle et al. |
| 8,805,691 B2 | 8/2014 | Genly |
| 8,861,924 B2 | 10/2014 | Meads et al. |
| 8,862,156 B2 | 10/2014 | Bell et al. |
| 8,885,882 B1 * | 11/2014 | Yin .......................... G06F 3/00 382/103 |
| 8,903,128 B2 | 12/2014 | Shet et al. |
| 8,913,103 B1 | 12/2014 | Sargin et al. |
| 8,942,986 B2 | 1/2015 | Cheyer et al. |
| 8,949,359 B2 | 2/2015 | Rasmussen et al. |
| 9,037,601 B2 | 5/2015 | Palay |
| 9,070,366 B1 | 6/2015 | Mathias et al. |
| 9,085,303 B2 | 7/2015 | Wolverton et al. |
| 9,119,512 B2 | 9/2015 | Martins, Jr. et al. |
| 9,123,330 B1 | 9/2015 | Sharifi et al. |
| 9,159,116 B2 | 10/2015 | Plagemann et al. |
| 9,171,542 B2 | 10/2015 | Gandrabur et al. |
| 9,230,544 B2 | 1/2016 | Kwon et al. |
| 9,245,497 B2 | 1/2016 | Pais et al. |
| 9,268,406 B2 | 2/2016 | Geisner et al. |
| 9,300,925 B1 | 3/2016 | Zhang |
| 9,307,355 B2 | 4/2016 | Nehrenz et al. |
| 9,311,932 B2 | 4/2016 | Carter |
| 9,318,105 B1 | 4/2016 | Khosla |
| 9,348,990 B2 | 5/2016 | Chuaprasert et al. |
| 9,368,114 B2 | 6/2016 | Larson et al. |
| 9,372,851 B2 | 6/2016 | Hazen et al. |
| 9,378,740 B1 | 6/2016 | Rosen et al. |
| 9,380,177 B1 | 6/2016 | Rao et al. |
| 9,389,681 B2 | 7/2016 | Sankar et al. |
| 9,412,392 B2 | 8/2016 | Lindahl |
| 9,424,840 B1 | 8/2016 | Hart et al. |
| 9,466,286 B1 | 10/2016 | Hart et al. |
| 9,495,331 B2 | 11/2016 | Govrin et al. |
| 9,495,613 B2 | 11/2016 | Holz et al. |
| 9,507,977 B1 | 11/2016 | Mor et al. |
| 9,508,341 B1 | 11/2016 | Parlikar et al. |
| 9,514,227 B1 | 12/2016 | Garrett et al. |
| 9,558,749 B1 | 1/2017 | Secker-Walker et al. |
| 9,576,574 B2 | 2/2017 | van Os |
| 9,622,059 B2 | 4/2017 | Bouzid et al. |
| 9,626,352 B2 | 4/2017 | Allen et al. |
| 9,633,652 B2 | 4/2017 | Kumiawati et al. |
| 9,669,296 B1 | 6/2017 | Hibbert et al. |
| 9,747,896 B2 | 8/2017 | Kennewick et al. |
| 9,749,583 B1 | 8/2017 | Fineberg et al. |
| 9,761,055 B2 | 9/2017 | Miller |
| 9,767,616 B2 | 9/2017 | Miller |
| 9,842,299 B2 | 12/2017 | Stolarz et al. |
| 9,898,250 B1 | 2/2018 | Williams et al. |
| 9,965,247 B2 | 5/2018 | Jarvis et al. |
| 10,178,301 B1 | 1/2019 | Welbourne et al. |
| 10,276,149 B1 | 4/2019 | Liang et al. |
| 10,482,885 B1 | 11/2019 | Moniz |
| 10,599,390 B1 | 3/2020 | Brahmbhatt et al. |
| 2003/0103647 A1 | 6/2003 | Rui et al. |
| 2003/0131064 A1 | 7/2003 | Bell et al. |
| 2005/0182627 A1 | 8/2005 | Tanaka et al. |
| 2005/0216264 A1 | 9/2005 | Attwater et al. |
| 2005/0225427 A1 | 10/2005 | Bell et al. |
| 2005/0285774 A1 | 12/2005 | Wittenberg et al. |
| 2006/0028552 A1 | 2/2006 | Aggarwal et al. |
| 2006/0067536 A1 | 3/2006 | Culbert et al. |
| 2007/0024487 A1 | 2/2007 | Zemany et al. |
| 2007/0100480 A1 | 5/2007 | Sinclair et al. |
| 2007/0152157 A1 | 7/2007 | Page |
| 2007/0198245 A1 | 8/2007 | Kamatani et al. |
| 2007/0271086 A1 | 11/2007 | Peters et al. |
| 2008/0015864 A1 | 1/2008 | Ross et al. |
| 2008/0030345 A1 | 2/2008 | Austin et al. |
| 2008/0071547 A1 | 3/2008 | Prieto et al. |
| 2008/0077015 A1 | 3/2008 | Boric-lubecke et al. |
| 2008/0195387 A1 | 8/2008 | Zigel et al. |
| 2008/0288251 A1 | 11/2008 | Cooper et al. |
| 2009/0066690 A1 | 3/2009 | Harrison |
| 2009/0303342 A1 | 12/2009 | Corcoran et al. |
| 2009/0319269 A1 | 12/2009 | Aronowitz |
| 2010/0073363 A1 | 3/2010 | Densham et al. |
| 2010/0100851 A1 | 4/2010 | Clark et al. |
| 2010/0179813 A1 | 7/2010 | Summerfield et al. |
| 2010/0195906 A1 | 8/2010 | Uliyar et al. |
| 2011/0010170 A1 | 1/2011 | Burns et al. |
| 2011/0119060 A1 * | 5/2011 | Aronowitz ............ G10L 17/02 704/250 |
| 2011/0184735 A1 | 7/2011 | Flaks et al. |
| 2011/0216090 A1 | 9/2011 | Woo et al. |
| 2011/0219339 A1 | 9/2011 | Densham |
| 2011/0298967 A1 | 12/2011 | Clavin et al. |
| 2011/0302535 A1 | 12/2011 | Clerc et al. |
| 2012/0026335 A1 | 2/2012 | Brown et al. |
| 2012/0253791 A1 | 10/2012 | Heck et al. |
| 2012/0265535 A1 | 10/2012 | Bryant-rich et al. |
| 2012/0268604 A1 | 10/2012 | Tree |
| 2013/0110519 A1 | 5/2013 | Cheyer et al. |
| 2013/0117377 A1 | 5/2013 | Miller |

(56) References Cited

U.S. PATENT DOCUMENTS

| | | | |
|---|---|---|---|
| 2013/0144616 A1 | 6/2013 | Bangalore | |
| 2013/0212501 A1 | 8/2013 | Anderson et al. | |
| 2013/0253936 A1 | 9/2013 | Harvey | |
| 2013/0259456 A1* | 10/2013 | Viswanathan | F24D 13/00 392/407 |
| 2013/0304479 A1 | 11/2013 | Teller et al. | |
| 2013/0342568 A1 | 12/2013 | Ambrus et al. | |
| 2014/0033071 A1 | 1/2014 | Gruber et al. | |
| 2014/0067679 A1 | 3/2014 | O'reilly et al. | |
| 2014/0100997 A1 | 4/2014 | Mayerle et al. | |
| 2014/0156276 A1 | 6/2014 | Nakano et al. | |
| 2014/0160290 A1* | 6/2014 | Wu | B60R 1/00 348/148 |
| 2014/0180629 A1 | 6/2014 | Dokmanic et al. | |
| 2014/0214421 A1 | 7/2014 | Shriberg et al. | |
| 2014/0214429 A1 | 7/2014 | Pantel | |
| 2014/0222422 A1 | 8/2014 | Sarikaya et al. | |
| 2014/0244263 A1 | 8/2014 | Pontual et al. | |
| 2014/0272821 A1 | 9/2014 | Pitschel et al. | |
| 2014/0330569 A1 | 11/2014 | Kolavennu et al. | |
| 2014/0341440 A1 | 11/2014 | Walch | |
| 2014/0365226 A1 | 12/2014 | Sinha | |
| 2015/0016642 A1 | 1/2015 | Walsh et al. | |
| 2015/0019714 A1 | 1/2015 | Shaashua et al. | |
| 2015/0025887 A1 | 1/2015 | Sidi et al. | |
| 2015/0032254 A1* | 1/2015 | Ishiguro | B25J 11/0005 700/245 |
| 2015/0032456 A1 | 1/2015 | Wait | |
| 2015/0035976 A1 | 2/2015 | Mayuzumi | |
| 2015/0102996 A1 | 4/2015 | Yim et al. | |
| 2015/0134547 A1 | 5/2015 | Oikonomidis | |
| 2015/0138332 A1 | 5/2015 | Cheng et al. | |
| 2015/0149179 A1 | 5/2015 | Korbecki | |
| 2015/0149182 A1 | 5/2015 | Kalns et al. | |
| 2015/0162000 A1 | 6/2015 | Di censo et al. | |
| 2015/0172285 A1 | 6/2015 | Lo et al. | |
| 2015/0195666 A1 | 7/2015 | Massey et al. | |
| 2015/0220244 A1* | 8/2015 | Vats | G06F 3/04815 715/850 |
| 2015/0249664 A1 | 9/2015 | Talhami et al. | |
| 2015/0278199 A1 | 10/2015 | Hazen et al. | |
| 2015/0279368 A1 | 10/2015 | Contolini et al. | |
| 2015/0340033 A1 | 11/2015 | Di fabbrizio et al. | |
| 2015/0347114 A1 | 12/2015 | Yoon | |
| 2015/0371639 A1 | 12/2015 | Foerster et al. | |
| 2015/0382047 A1 | 12/2015 | Van os et al. | |
| 2016/0019889 A1 | 1/2016 | Alvarez guevara et al. | |
| 2016/0063989 A1* | 3/2016 | Deleeuw | G10L 15/22 345/473 |
| 2016/0086018 A1 | 3/2016 | Lemoff | |
| 2016/0088043 A1 | 3/2016 | Jiang et al. | |
| 2016/0092732 A1 | 3/2016 | Black | |
| 2016/0110347 A1 | 4/2016 | Kennewick et al. | |
| 2016/0138247 A1 | 5/2016 | Conway et al. | |
| 2016/0148417 A1 | 5/2016 | Kim et al. | |
| 2016/0155443 A1 | 6/2016 | Khan et al. | |
| 2016/0171289 A1 | 6/2016 | Lee et al. | |
| 2016/0173293 A1 | 6/2016 | Kennedy | |
| 2016/0179831 A1 | 6/2016 | Gruber et al. | |
| 2016/0187961 A1 | 6/2016 | Elibol et al. | |
| 2016/0203002 A1 | 7/2016 | Kannan et al. | |
| 2016/0210411 A1 | 7/2016 | Mentis | |
| 2016/0217783 A1 | 7/2016 | Konuma et al. | |
| 2016/0225373 A1 | 8/2016 | Casado et al. | |
| 2016/0234595 A1 | 8/2016 | Goran et al. | |
| 2016/0234616 A1 | 8/2016 | Gateau | |
| 2016/0253310 A1 | 9/2016 | Hazen et al. | |
| 2016/0259623 A1 | 9/2016 | Sumner et al. | |
| 2016/0283185 A1 | 9/2016 | Mclaren et al. | |
| 2016/0313868 A1 | 10/2016 | Weng et al. | |
| 2016/0342702 A1 | 11/2016 | Barve et al. | |
| 2016/0358598 A1 | 12/2016 | Williams et al. | |
| 2016/0360336 A1 | 12/2016 | Gross et al. | |
| 2016/0380929 A1 | 12/2016 | Katis et al. | |
| 2017/0013409 A1 | 1/2017 | Cerchio et al. | |
| 2017/0025124 A1 | 1/2017 | Mixter et al. | |
| 2017/0032021 A1 | 2/2017 | Watanachote | |
| 2017/0032787 A1 | 2/2017 | Dayal | |
| 2017/0039423 A1 | 2/2017 | Cork et al. | |
| 2017/0039602 A1 | 2/2017 | Shi-nash et al. | |
| 2017/0068423 A1 | 3/2017 | Napolitano et al. | |
| 2017/0078573 A1 | 3/2017 | Chen et al. | |
| 2017/0133011 A1 | 5/2017 | Chen et al. | |
| 2017/0140760 A1 | 5/2017 | Sachdev | |
| 2017/0169476 A1* | 6/2017 | Nomula | G06N 3/006 |
| 2017/0185375 A1 | 6/2017 | Martel et al. | |
| 2017/0186290 A1* | 6/2017 | Li | G06Q 10/00 |
| 2017/0194000 A1 | 7/2017 | Itani et al. | |
| 2017/0206900 A1 | 7/2017 | Lee et al. | |
| 2017/0213157 A1 | 7/2017 | Bugay et al. | |
| 2017/0230705 A1 | 8/2017 | Pardue et al. | |
| 2017/0236512 A1 | 8/2017 | Williams et al. | |
| 2017/0242651 A1 | 8/2017 | Lang et al. | |
| 2017/0249309 A1 | 8/2017 | Sarikaya | |
| 2017/0255450 A1 | 9/2017 | Mullins et al. | |
| 2017/0262472 A1 | 9/2017 | Goldenberg | |
| 2017/0269975 A1 | 9/2017 | Wood et al. | |
| 2017/0278480 A1 | 9/2017 | Sung et al. | |
| 2017/0286530 A1* | 10/2017 | Paruchuri | G06F 16/3344 |
| 2017/0287490 A1 | 10/2017 | Biswal et al. | |
| 2017/0315208 A1 | 11/2017 | Sadr | |
| 2017/0322939 A1 | 11/2017 | Byron et al. | |
| 2017/0351749 A1 | 12/2017 | Quirk et al. | |
| 2017/0357637 A1 | 12/2017 | Nell et al. | |
| 2017/0359666 A1 | 12/2017 | Lyren et al. | |
| 2018/0009118 A1* | 1/2018 | Yamaga | B25J 19/026 |
| 2018/0047394 A1 | 2/2018 | Tian et al. | |
| 2018/0048768 A1 | 2/2018 | Spittle et al. | |
| 2018/0074785 A1 | 3/2018 | Ohmura | |
| 2018/0090143 A1 | 3/2018 | Saddler et al. | |
| 2018/0091782 A1 | 3/2018 | Bashkin | |
| 2018/0096696 A1 | 4/2018 | Mixter | |
| 2018/0107930 A1 | 4/2018 | Aggarwal et al. | |
| 2018/0158454 A1 | 6/2018 | Campbell et al. | |
| 2018/0199123 A1 | 7/2018 | Rao et al. | |
| 2018/0218080 A1 | 8/2018 | Krishnamurthy et al. | |
| 2018/0231653 A1 | 8/2018 | Pradeep et al. | |
| 2018/0232201 A1 | 8/2018 | Holtmann | |
| 2018/0232563 A1 | 8/2018 | Albadawi et al. | |
| 2018/0232608 A1 | 8/2018 | Pradeep et al. | |
| 2018/0232645 A1 | 8/2018 | Finkelstein et al. | |
| 2018/0232662 A1 | 8/2018 | Solomon et al. | |
| 2018/0232902 A1 | 8/2018 | Albadawi et al. | |
| 2018/0233132 A1 | 8/2018 | Herold et al. | |
| 2018/0233139 A1 | 8/2018 | Finkelstein et al. | |
| 2018/0233140 A1 | 8/2018 | Koishida et al. | |
| 2018/0233141 A1 | 8/2018 | Solomon et al. | |
| 2018/0233142 A1 | 8/2018 | Koishida et al. | |
| 2018/0233145 A1 | 8/2018 | Bathiche et al. | |
| 2018/0260680 A1 | 9/2018 | Finkelstein et al. | |
| 2018/0293221 A1 | 10/2018 | Finkelstein et al. | |
| 2018/0314689 A1* | 11/2018 | Wang | G06F 40/58 |
| 2018/0333862 A1* | 11/2018 | Hayashi | A63H 13/005 |
| 2019/0057703 A1 | 2/2019 | Zeinstra | |
| 2020/0012906 A1 | 1/2020 | Albadawi et al. | |
| 2020/0042839 A1 | 2/2020 | Herold et al. | |
| 2020/0104653 A1 | 4/2020 | Solomon et al. | |

FOREIGN PATENT DOCUMENTS

| | | |
|---|---|---|
| CN | 103262156 A | 8/2013 |
| CN | 104272709 A | 1/2015 |
| CN | 104423537 A | 3/2015 |
| CN | 105070288 A | 11/2015 |
| CN | 105389307 A | 3/2016 |
| CN | 105408891 A | 3/2016 |
| CN | 105611500 A | 5/2016 |
| CN | 106104517 A | 11/2016 |
| CN | 106157952 A | 11/2016 |
| CN | 106164921 A | 11/2016 |
| CN | 106340299 A | 1/2017 |
| EP | 2947476 A1 | 11/2015 |
| GB | 2522922 | 8/2015 |

(56) References Cited

FOREIGN PATENT DOCUMENTS

| KR | 1020070016280 A | 2/2007 |
|---|---|---|
| WO | 2007018523 A2 | 2/2007 |
| WO | 2010104772 A1 | 9/2010 |
| WO | 2013061268 A2 | 5/2013 |
| WO | 2015012449 A1 | 1/2015 |
| WO | 2016043005 A1 | 3/2016 |
| WO | 2016114922 A1 | 7/2016 |
| WO | 2016157662 A1 | 10/2016 |
| WO | 2016162678 A1 | 10/2016 |
| WO | 2016205419 A1 | 12/2016 |

OTHER PUBLICATIONS

"Non Final Office Action Issued in U.S. Appl. No. 15/682,425", dated May 6, 2019, 12 Pages.
"Non Final Office Action Issued in U.S. Appl. No. 15/832,656", dated Jan. 6, 2020, 9 Pages.
"Non Final Office Action Issued in U.S. Appl. No. 15/657,822", dated Feb. 6, 2020, 25 Pages.
"Final Office Action Issued in U.S. Appl. No. 15/646,871", dated Jan. 21, 2020, 23 Pages.
"Final Office Action Issued in U.S. Appl. No. 15/640,251", dated Jan. 30, 2020, 21 Pages.
"Non Final Office Action Issued in U.S. Appl. No. 16/005,470", dated Feb. 24, 2020, 11 Pages.
"Non Final Office Action Issued in U.S. Appl. No. 15/636,422", dated Sep. 4, 2018, 11 Pages.
"Non Final Office Action Issued in U.S. Appl. No. 15/640,251", dated Oct. 15, 2018, 22 Pages.
"Non Final Office Action Issued in U.S. Appl. No. 15/646,871", dated Dec. 19, 2018, 22 Pages.
"Non Final Office Action Issued in U.S. Appl. No. 15/656,994", dated Jan. 22, 2019, 8 Pages.
"Non Final Office Action Issued in U.S. Appl. No. 15/657,031", dated Oct. 5, 2018, 16 Pages.
"Non-Final Office Action Issued in U.S. Appl. No. 15/657,822", dated Feb. 21, 2019, 25 Pages.
"Non Final Office Action Issued in U.S. Appl. No. 15/832,656", dated Feb. 7, 2019, 8 Pages.
"Non Provisional Application Filed in U.S. Appl. No. 15/885,518", filed Jan. 31, 2018, 40 Pages.
Miro, et al., "Speaker Diarization: A review of Recent Research", In the Proceedings of IEEE Transactions on Audio, Speech and Language Processing, vol. 20, Issue 2, Feb. 1, 2012, 15 Pages.
Moattar, et al., "A Review on Speaker Diarization Systems and Approaches", In the Publication of Speech Communications, vol. 54, Issue 10, Dec. 12, 2010, 39 Pages.
"International Search Report & Written Opinion for PCT Patent Application No. PCT/US2018/062384", dated Feb. 15, 2019, 12 Pages.
Yu, et al., "Smart Meeting Systems: A Survey of State of the Art and Open Issues", In the Proceedings of ACM Computing Surveys, vol. 42, No. 2, Mar. 5, 2010, 20 Pages.
"Final Office Action Issued in U.S. Appl. No. 15/640,251", dated Apr. 2, 2019, 22 Pages.
"Non Final Office Action Issued in U.S. Appl. No. 15/640,251", dated Sep. 12, 2019, 21 Pages.
"Notice of Allowance Issued in U.S. Appl. No. 16/573,677", dated Nov. 6, 2019, 9 Pages.
"SARA: the Socially Aware Robot Assistant", Retrieved From: https://web.archive.org/web/20160707141922/http:/articulab.hcii.cs.cmu.edu:80/projects/sara/, Jul. 7, 2017, 10 Pages.
Arsikere, et al., "Computationally-efficient Endpointing Features for Natural Spoken Interaction with Personal-Assistant Systems", In Proceedings of IEEE International Conference on Acoustics, Speech and Signal Processing, May 4, 2014, pp. 3241-3245.
Ferrer, et al., "Is the Speaker Done Yet? Faster and More Accurate End-of-Utterance Detection using Prosody", In Proceedings of Seventh International Conference on Spoken Language Processing, Sep. 16, 2002, pp. 2061-2064.

Lacharite, Noelle, "Updated: Alexa Skills Kit Fact Template: Step-by-Step Guide to Build a Fact Skill", Retrieved From: https://developer.amazon.com/blogs/post/Tx3DVGGOKOTPUGQ/New-Alexa-Skills-Kit-Template:-Step-by-Step-Guide-to-Build-a-Fact-Skill, Mar. 29, 2016, 33 Pages.
"International Search Report and Written Opinion Issued in PCT Application No. PCT/US2018/017140", dated May 18, 2018, 12 Pages.
"International Search Report and Written Opinion Issued in PCT Application No. PCT/US2018/017514", dated May 17, 2018, 12 Pages.
Porcheron, et al., "Do Animals Have Accents?": Talking with Agents in Multi-Party Conversation, In Proceedings of 20th ACM Conference on Computer-Supported Cooperative Work and Social Computing, Feb. 25, 2017, 14 Pages.
Xiang, Li, "Improving Knowledge Base Population With Information Extraction", A Thesis Submitted in Partial fulfillment of the Requirements of the University of New York for the Degree of Doctor of Philosophy, May 2016, 131 Pages.
Yun-Nung, Chen, "Unsupervised Learning and Modeling of Knowledge and Intent for Spoken Dialogue Systems", Proceedings of the 53rd Annual Meeting of the Association for Computational Linguistics, Jul. 28, 2015, 8 Pages.
Zhang, et al., "A Joint Model of Intent Determination and Slot Filling for Spoken Language Understanding", In Proceedings of the Twenty-Fifth International Joint Conference on Artificial Intelligence, Jul. 9, 2016, pp. 2993-2999.
"Non-Final Office Action Issued in U.S. Appl. No. 15/646,871", dated Sep. 3, 2019, 23 Pages.
"Final Office Action Issued in U.S. Appl. No. 15/657,822", dated Aug. 22, 2019, 22 Pages.
"Non Final Office Action Issued in U.S. Appl. No. 15/682,407", dated Jun. 26, 2019, 15 Pages.
"Final Office Action Issued in U.S. Appl. No. 15/832,656", dated Aug. 23, 2019, 10 Pages.
Constine, Jose, "Instagram launches selfie filters, copying the last big Snapchat feature", Retrieved from https://techcrunch.com/2017/05/16/instagram-face-filters/, May 16, 2017, 8 Pages.
"International Search Report and Written Opinion Issued in PCT Application No. PCT/US2019/022836", dated Jun. 24, 2019, 15 Pages.
"International Search Report and Written Opinion Issued in PCT Application No. PCT/US2019/029558", dated Jun. 28, 2019, 10 Pages.
Staff, Appleinsider, "Amazon Alexa's 'Follow-Up Mode' Enables Successive Requests Without Trigger Word", Retrieved From https://appleinsider.com/articles/18/03/09/amazon-alexas-follow-up-mode-enables-successive-requests-without-trigger-word, Mar. 9, 2018, 7 Pages.
"Multiple Agents (Each Trained for Different Domain) for One Chat Bot?", Retrieved From https://discuss.api.ai/t/multiple-agents-each-trained-for-different-domain-for-one-chat-bot/1002, Jul. 1, 2016, 1 Page.
"Train the Natural Language Processing Classifiers", Retrieved From https://www.mindmeld.com/docs/train_the_natural_language_processing_classifiers.html, Retrieved on: May 2, 2017, 10 Pages.
"Using Multiple Alexa Devices", Retrieved From https://www.amazon.com/gp/help/customer/display.html?nodeId=202013740, Apr. 24, 2017, 2 Pages.
"Application Filed in U.S. Appl. No. 15/395,961", filed Dec. 30, 2016, 79 Pages.
Ballan, et al., "Event Detection and Recognition for Semantic Annotation of Video", In Journal of Multimedia Tools and Applications, vol. 51, Issue 1, Nov. 10, 2010, pp. 279-302.
Beltagy, et al., "Improved Semantic Parsers for If-Then Statements", In Proceedings of the 54th Annual Meeting of the Association for Computational Linguistics, vol. 1, Aug. 7, 2016, pp. 726-736.
Boakye, et al., "Overlapped Speech Detection for Improved Speaker Diarization in Multiparty Meetings", In Proceedings of IEEE International Conference on Acoustics, Speech and Signal Processing, Mar. 31, 2008, 4 Pages.

(56) References Cited

OTHER PUBLICATIONS

Cho, et al., "A Multi-Sensor Fusion System for Moving Object Detection and Tracking in Urban Driving Environments", In IEEE International Conference on Robotics & Automation, May 31, 2014, 8 Pages.
Fossard, et al., Between Anaphora and Deixis . . . The Resolution of the Demonstrative Noun Phrase "that N", In Journal of Language and Cognitive Processes, vol. 27, Issue 9, Nov. 2, 2011, 3 Pages.
Gebhart, Andrew, "How to bring Alexa into every room of your home", Retrieved From https://www.cnet.com/how-o/how-to-install-alexa-in-every-room-of-your-home/,Feb. 2, 2017, 7 Pages.
Goncalves, et al., "Assessing Users' Emotion at Interaction Lime: A Multimodal Approach With Multiple Sensors", In Proceedings of Soft Computing, vol. 21, Issue 18, Sep. 1, 2017, 8 Pages.
Goswami, et al., "A Reviewon Low Light Image Enhancement Using Image Processing Technique", In International Journal of Technical Research, vol. 5, Issue 1, Mar. 2016, pp. 60-62.
He, et al., "Sensor Scheduling for Target Tracking: A Monte Carlo sampling approach", In Journal of Digital Signal Processing, vol. 16, Issue 5, Sep. 2006, pp. 533-545.
Huijbregts, et al., "Speech Overlap Detection in a Two-Pass Speaker Diarization System", In Proceedings of 10th Annual Conference of the International Speech Communication, Sep. 6, 2009, pp. 1063-1066.
Kabadjov, Mijail Alexandrov., "A Comprehensive Evaluation of Anaphora Resolution and Discourse—new Classification", In thesis of University of Essex, May, 2007, 266 Pages.
Kang, et al., "Detection and Tracking of Moving Objects from Overlapping EO and IR Sensors", In Conference on Computer Vision and Pattern Recognition Workshop, Jun. 27, 2004, 6 Pages.
Kozhaya, Joe, "10 Steps to Train an Effective Chatbot and its Machine Learning Models", Retrieved From https://developer.ibm.com/dwblog/2016/10-steps-train-chat-bot-chatbot-machine-learning/, Dec. 12, 2016, 7 Pages.
Li, et al., "A Multiple-Camera System Calibration Toolbox Using a Feature Descriptor-based Calibration Pattern", In Proceedings of IEEE International Conference on Intelligent Robots and Systems, Nov. 3, 2013, pp. 1301-1307.
Liu, et al., "Reliable Multiple Object Tracking under Heavy Occlusions", In Proceedings on Intelligence Information Processing and Trusted Computing (IPTC), International Symposium, Oct. 28, 2010, 3 Pages.
Mengusoglu, Erhan, "Confidence Measures for Speech/Speaker Recognition and Applications on Turkish LVCSR", Retrieved From https://web.archive.org/web/20040619044603/http://www.tcts.fpms.ac.be/publications/phds/mengusoglu/thesis_mengus.pdf, Apr. 20, 2004, 143 Pages.
Verma et al., "Face Detection and Tracking in a Video by Propagating Detection Probabilities", In Proceedings of IEEE Transactions on Pattern Analysis and Machine Intelligence, vol. 25, Issue 10, Oct. 1, 2003, pp. 1215-1228.
M. K., et al., "Ambiguities in Natural Language Processing", In International Journal of Innovative Research in Computer and Communication Engineering, vol. 2, Special Issue 5, Oct. 2014, pp. 392-394.
Pan, et al., "Robust Occlusion Handling in Object Tracking", In IEEE Conference on Computer Vision and Pattern Recognition, Jun. 17, 2007, 8 Pages.
Panzarino, Matthew, "Here's an Actual 3D Indoor Map of a Room Captured With Google's Project Tango Phone", Retrieved From https://techcrunch.com/2014/02/21/heres-an-actual-3d-indoor-map-of-a-room-captured-with-googles-project-tango-phone/, Feb. 21, 2014, 6 Pages.
"International Search Report and Written Opinion Issued in PCT Application No. PCT/US2018/017139", dated May 8, 2018, 13 Pages.
"International Search Report and Written Opinion Issued in PCT Application No. PCT/US2018/017506", dated May 4, 2018, 13 Pages.
"International Search Report and Written Opinion Issued in PCT Application No. PCT/US2018/017508", dated May 8, 2018, 13 Pages.
"International Search Report and Written Opinion Issued in PCT Application No. PCT/US2018/017509", dated May 11, 2018, 11 Pages.
"International Search Report and Written Opinion Issued in PCT Application No. PCT/US2018/017510", dated Apr. 20, 2018, 14 Pages.
"International Search Report and Written Opinion Issued in PCT Application No. PCT/US2018/017511", dated May 17, 2018, 12 Pages.
"International Search Report and Written Opinion Issued in PCT Application No. PCT/US2018/017512", dated May 4, 2018, 15 Pages.
"International Search Report and Written Opinion Issued in PCT Application No. PCT/US2018/017513", dated Apr. 12, 2018, 15 Pages.
"International Search Report and Written Opinion Issued in PCT Application No. PCT/US2018/017515", dated May 9, 2018, 12 Pages.
"International Search Report and Written Opinion Issued in PCT Application No. PCT/US2018/017517", dated May 11, 2018, 12 Pages.
Pullen, John Patrick., "Amazon Echo Tip: How to Add Multiple Users ! Time", Retrieved From http://time.com/4668359/amazon-echo-alexa-multiple-accounts/, Feb. 13, 2017, 3 Pages.
Quirk, et al., "Language to Code: Learning Semantic Parsers for If-This-Then-That Recipes", In Proceedings of the 53rd Annual Meeting of the Association for Computational Linguistics, Jul. 26, 2015, pp. 878-888.
Rizwan, et al., "Local Enhancement for Robust Face Detection in Poor SNR Images", In International Journal of Computer Science and Network Security, vol. 9, Issue 6, Jun. 2009, pp. 93-96.
Sinha, et al., "An Analysis Engine for Dependable Elicitation on Natural Language Use Case Description and its Application to Industrial Use Cases", In IBM Research Report, RC242712, Dec. 18, 2008, 12 Pages.
Toutanova, et al., "Compositional Learning of Embeddings for Relation Paths in Knowledge Bases and Text", In Proceedings of the 54th Annual Meeting of the Association for Computational Linguistics, Aug. 7, 2016, pp. 1434-1444.
Wagner, Martin, "Tracking with Multiple Sensors", Faculty of Computer Science at the Technical University of Munich, Sep. 12, 2004, 202 Pages.
Wheeler, et al., "Face Recognition at a Distance", In Publication of Springer, Jan. 2011, pp. 353-381.
Yamamoto, S, et al., "Algorithm Optimizations for Low-Complexity Eye Tracking", In Proceedings of IEEE International Conference on Systems, Man, and Cybernetics, Oct. 2009, pp. 18-22.
Kalal, et al., "Face-TLD: Tracking-Learning-Detection Applied to Faces", In Proceedings of 17th IEEE International Conference on Image Processing, Sep. 26, 2010, pp. 3789-3792.
Zotkin, et al., "Joint Audio-Visual Tracking Using Particle Filters", in EURASIP Journal on Applied Signal Processing, vol. 2002, Issue 1, Jan. 2002, pp. 1154-1164.
"Office Action Issued in European Patent Application No. 18707800.1", dated Jun. 4, 2020, 4 Pages.
"Office Action Issued in European Patent Application No. 18708508.9", dated May 28, 2020, 6 Pages.
"Non Final Office Action Issued in U.S. Appl. No. 15/640,113", dated May 14, 2020, 13 Pages.
"Non Final Office Action Issued in U.S. Appl. No. 15/640,201", dated May 27, 2020, 11 Pages.
"Notice of Allowance Issued in U.S. Appl. No. 15/832,656", dated Apr. 22, 2020, 8 Pages.
"Notice of Allowance Issued in U.S. Appl. No. 15/832,672", dated Jun. 2, 2020, 11 Pages.
"Non Final Office Action Issued in U.S. Appl. No. 15/646,871", dated Jul. 1, 2020, 24 Pages.
"Final Office Action Issued in U.S. Appl. No. 15/657,822", dated Aug. 7, 2020, 22 Pages.

(56) References Cited

OTHER PUBLICATIONS

"Notice of Allowance Issued in U.S. Appl. No. 15/640,251", dated Jul. 31, 2020, 11 Pages.
"Final Office Action Issued in U.S. Appl. No. 16/005,470", dated Sep. 4, 2020, 15 Pages.
Sarikaya, Ruhi, "The Technology Behind Personal Digital Assistants: An Overview of the System Architecture and key Components", In Journal of IEEE Signal Processing Magazine, vol. 34, Issue 1, Jan. 11, 2017, pp. 67-81.
"Non Final Office Action Issued in U.S. Appl. No. 15/980,631", dated Sep. 18, 2020, 12 Pages.
"Office Action Issued in European Patent Application No. 18706104.9", dated Sep. 21, 2020, 4 Pages.
"Non Final Office Action Issued in U.S. Appl. No. 16/700,308", dated Sep. 25, 2020, 18 Pages.
"Non Final Office Action Issued in U.S. Appl. No. 16/599,426", dated Jan. 12, 2021, 10 Pages.
"First Office Action and Search Report Issued in Chinese Patent Application No. 201880011578.3", dated Feb. 2, 2021, 12 Pages.
"First Office Action and Search Report Issued in Chinese Patent Application No. 201880011967.6", dated Feb. 2, 2021, 13 Pages.
"First Office Action and Search Report Issued in Chinese Patent Application No. 201880011970.8", dated Feb. 2, 2021, 15 Pages.
"First Office Action and Search Report Issued in Chinese Patent Application No. 201880012028.3", dated Feb. 2, 2021, 13 Pages.
"First Office Action and Search Report Issued in Chinese Patent Application No. 201880011885.1", dated Feb. 1, 2021, 16 Pages.

\* cited by examiner

INTELLIGENT ASSISTANT DEVICE COMMUNICATING NON-VERBAL CUES

CROSS REFERENCE TO RELATED APPLICATIONS

This application is a continuation-in-part of U.S. application Ser. No. 15/682,407 filed on Aug. 21, 2017, which claims priority to U.S. Provisional Patent Application Ser. No. 62/459,020 filed Feb. 14, 2017 and to U.S. Provisional Patent Application Ser. No. 62/482,165 filed Apr. 5, 2017. Each of the non-provisional patent application Ser. No. 15/682,407, the provisional patent application Ser. No. 62/459,020, and the provisional patent application Ser. No. 62/482,165 are incorporated herein by reference for all purposes. This application also claims priority to U.S. Provisional Patent Application Ser. No. 62/482,165 filed Apr. 5, 2017 and to U.S. Provisional Patent Application Ser. No. 62/597,297 filed Dec. 11, 2017, both of which are incorporated herein by reference for all purposes.

BACKGROUND

Intelligent assistant devices, such as voice command devices or "smart speakers" and their virtual assistants, may receive and process verbal queries and commands to provide intelligent assistance to users. These devices are typically activated by speaking a keyword and provide verbalized responses to requests via computerized speech that is broadcast to a user. However, these devices do not provide non-verbal communication in the absence of user commands or requests.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for communicating non-verbal cues comprises receiving image data indicating presence of a human from one or more cameras of an intelligent assistant device. In response, one or more components of the device are actuated to non-verbally communicate the presence of the human. Data indicating context information of the human is received from one or more sensors of device. Using at least this data, one or more contexts of the human are determined. In response, one or more components of the intelligent assistant device is actuated to non-verbally communicate the one or more contexts of the human.

DETAILED DESCRIPTION

The proliferation of smart assistant devices reflects their increasing popularity, as people seek greater convenience in their day-to-day lives. As noted, such devices can perform tasks and services for users via convenient voice interactions. However, because these devices do not provide non-verbal communications of their understandings about a user, much information that would be helpful to convey is left uncommunicated.

When people interact with one another, non-verbal communication is often used, consciously and unconsciously, to convey useful understandings. For example, when Alice is walking down a street and another person Bhavana approaches, non-verbal cues from Bhavana can communicate to Alice certain understandings of Bhavana about Alice. If the Bhavana looks at Alice with a curious gaze and face, she communicates to Alice that she might know or thinks she knows Alice. If Bhavana reacts to Alice with obvious joy and surprise, she communicates that she is excited to see Alice. On the other hand, if Bhavana scowls and diverts her path away from Alice, she communicates a very different message. Of course many other types and forms of non-verbal communication also may provide wordless clues and cues, such as posture, gesture, distance, etc.

Such non-verbal communications make possible much more informative and rich interactions between people. Accordingly, the present disclosure is directed to intelligent assistant devices and methods for communicating non-verbal information via such devices. The methods and techniques discussed herein are primarily described from the perspective of a standalone, all-in-one intelligent assistant device configured to respond to natural language inputs, for example by answering questions or performing actions. The intelligent assistant device utilizes an entity-tracking computing system. In some examples, tracking of entities in an environment may be performed using sensor inputs solely from the intelligent assistant device. In other examples, tracking of entities may be performed using various intelligent assistant computing devices, and/or other sensors, security devices, home automation devices, etc.

Figure 1:
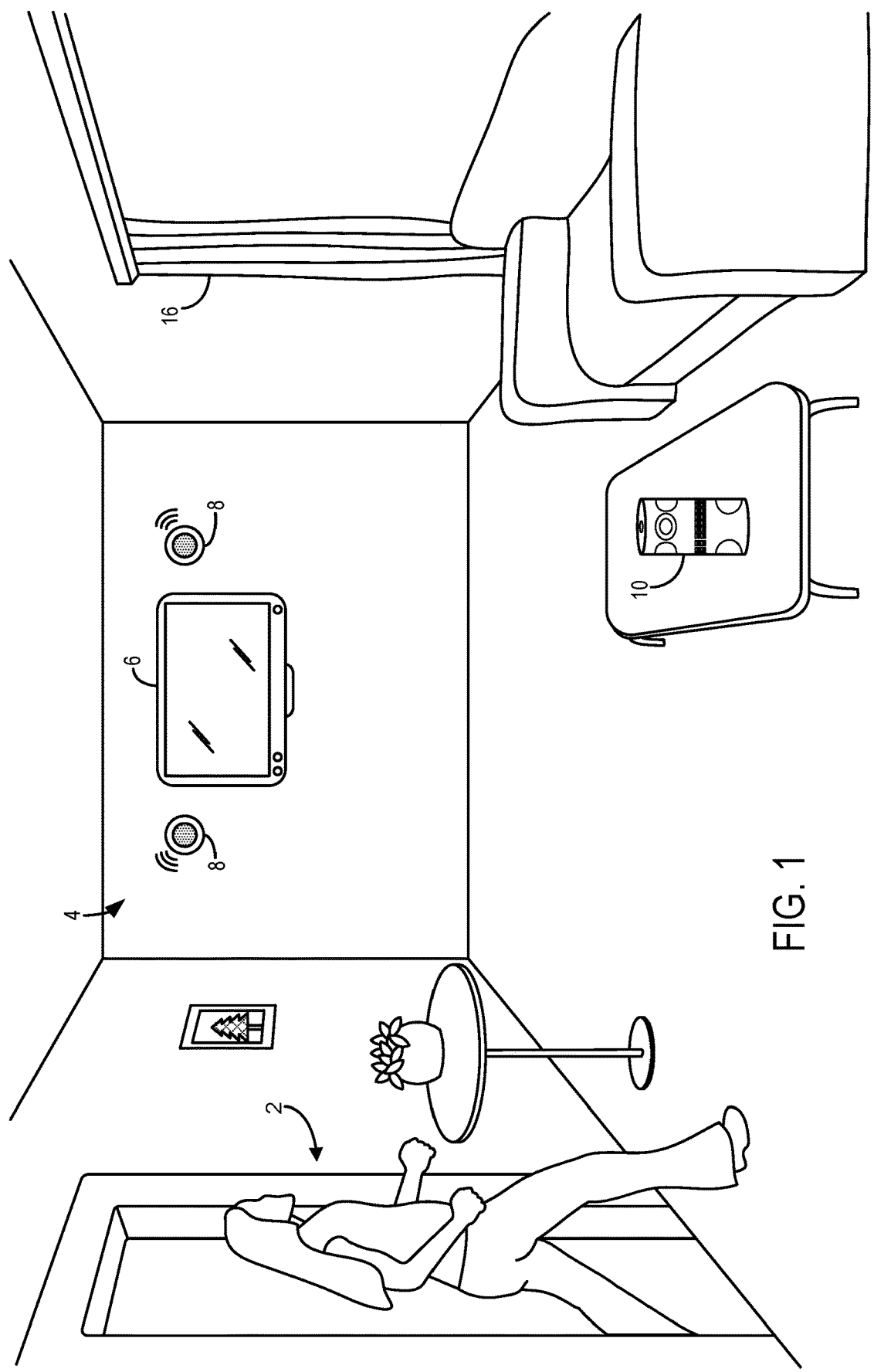
FIG. 1 shows an example environment with an intelligent assistant device in the form of an all-in-one computing device according to an example of the present disclosure.

FIG. 1 illustrates a human 2 entering a living room 4 with one example of an intelligent assistant device 10 in the form of an all-in-one computing device. As described in more detail below, in some examples intelligent assistant device 10 may be configured to receive and process natural language inputs. A user may utilize the intelligent assistant device for myriad functions. For example, the user may provide natural language input to ask the intelligent assistant device to perform a variety of tasks, such as provide information, change the state of a device, send a message, complete a purchase, etc.

The user may ask the system for information about a wide range of topics, such as the weather, personal calendar events, movie show times, etc. In some examples, the intelligent assistant device 10 also may be configured to control elements in the living room 4, such as a television 6, speakers 8 of a music system, or motorized curtains 16. The intelligent assistant device 10 also may be utilized to receive and store messages and/or reminders to be delivered at an appropriate future time. Using data received from sensors, the intelligent assistant device may track and/or communicate with one or more users or other entities. Additionally and as described in more detail below, the intelligent assistant device 10 may communicate non-verbal information to a user via one or more light sources and/or other components of the device.

In some examples, the intelligent assistant device 10 may be operatively connected with one or more other computing devices using a wired connection, or may employ a wireless connection via Wi-Fi, Bluetooth, or any other suitable wireless communication protocol. For example, the intelligent assistant device 10 may be communicatively coupled to one or more other computing devices via a network. The network may take the form of a local area network (LAN), wide area network (WAN), wired network, wireless network, personal area network, or a combination thereof, and may include the Internet. Additional details regarding components and computing aspects of the intelligent assistant device 10 are described in more detail below with reference to FIG. 19.

While the intelligent assistant device may be operatively connected to other devices as described above, in some examples the intelligent assistant device may perform the methods and techniques described herein entirely locally via one or more processors onboard the device. Advantageously, in these examples any latencies, bandwidth limitations and other drawbacks associated with exchanging data with remote servers or other devices is eliminated. In this manner, more real-time interactions and non-verbal communications with users are made possible.

Figure 2:
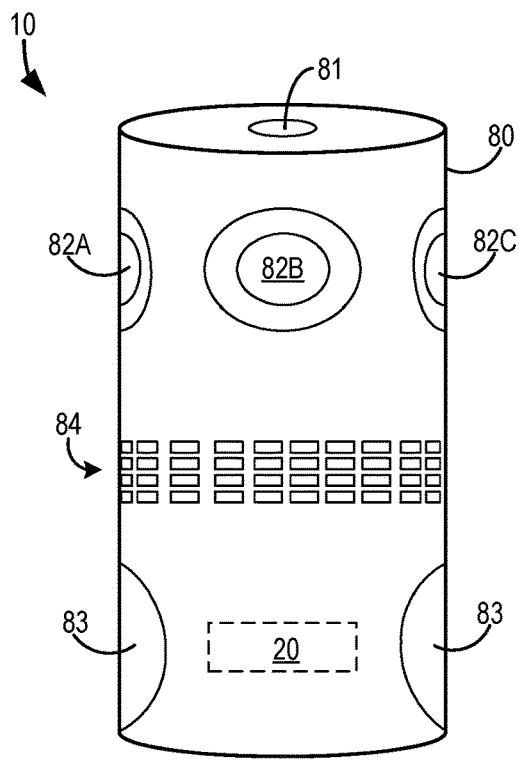
FIG. 2 schematically shows an example of the intelligent assistant device of FIG. 1 according to examples of the present disclosure.

FIG. 2 schematically illustrates one example implementation of an intelligent assistant device according to the present disclosure. In this example, intelligent assistant device 10 is an all-in-one computing device that includes a variety of sensors, output devices and other components. The device includes an intelligent assistant system 10 capable of recognizing and responding to natural language inputs according to examples of the present disclosure. Additional description and details of the components of and functions performed by intelligent assistant system 10 are provided below.

In the example of FIG. 2, intelligent assistant device 10 comprises a cylindrical enclosure 80 housing a microphone 81, cameras 82, speakers 83, and a plurality of light sources 84 located around at least a portion of the enclosure. In this example, the light sources 84 comprise LEDs. In other examples, one or more of the light sources 84 may comprise one or more display devices, or any other suitable type of light source. Additionally and as described in more detail below, one or more of the light sources 84 may be illuminated and modulated to non-verbally communicate information to a user.

In different examples, microphone 81 may comprise a plurality of microphones arranged at various locations on the device, such as an array of microphones. In the present example, three cameras 82A, 82B and 82C are shown and a fourth camera (not visible) is located on a back side of the enclosure. In this example, the fields of view of the four cameras 82 overlap to enable intelligent assistant device 10 to receive image data from a full 360 degrees around the device. In other examples, fewer or more cameras may be utilized, as well as configurations providing less than a 360-degree field of detection (FOD). Additional details regarding various types of cameras, microphones and other sensors that may be utilized with intelligent assistant device 10 are provided below.

Figure 3:
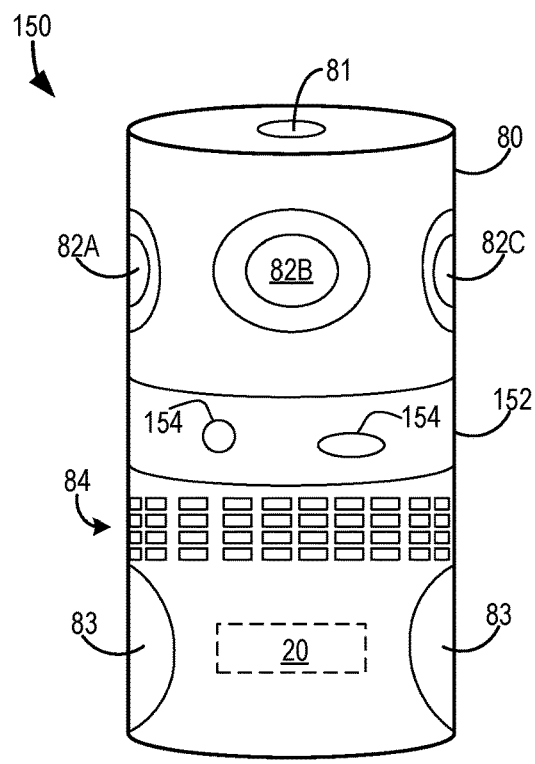
FIG. 3 schematically shows another example of an intelligent assistant device of according to examples of the present disclosure.

In other examples, in addition to or instead of LEDs, a light source in the form of one or more display devices may be utilized. For example and with reference to FIG. 3, another implementation of an intelligent assistant device 150 is schematically illustrated that includes a display 152 encircling the perimeter of the enclosure 80. In this example, the display 152 may be utilized to display vector graphics 154, such as a variety of static or animated shapes, patterns, etc., to non-verbally communicate with a user as described in the examples below.

In other examples, in addition to or instead of using LEDs and/or one or more displays to provide non-verbal communication, an intelligent assistant device may utilize one or more projectors to project non-verbal cues onto a surface. For example and with reference to FIG. 4, another implementation of an intelligent assistant device 158 is schematically illustrated that includes a projector 180 that may project light onto a surface. In this example, projector 180 projects an image of a circle 182 onto the surface 184 of a table on which the device sits. As described in more detail below, such projected light may create any number of static or animated shapes, patterns, icons, etc., that may be utilized to communicate non-verbal cues to a user.

In other examples, in addition to or instead of using LEDs, one or more displays, and/or one or more projectors to provide non-verbal communication, an intelligent assistant device may actuate one or more other components to non-verbally communicate information to a user. For example and with reference to FIGS. 5A and 5B, another implementation of an intelligent assistant device 186 is schematically illustrated that includes a moveable top portion 188 comprising a camera 189. In this example and as described in more detail below, moveable top portion 188 may be actuated to communicate non-verbal cues to a user. In some examples, the intelligent assistant device 186 may track a location of a person, and the moveable top portion 188 may be moved around a perimeter of the device to follow the person's location and to foveate the camera 189 on the person.

It will be appreciated that the example intelligent assistant devices 10, 150, 158 and 186 described and shown in FIGS. 2-5 are provided for illustrative purposes only, and many other form factors, shapes, configurations, and other variations of such devices may be utilized and are within the scope of the present disclosure.

Figure 6:
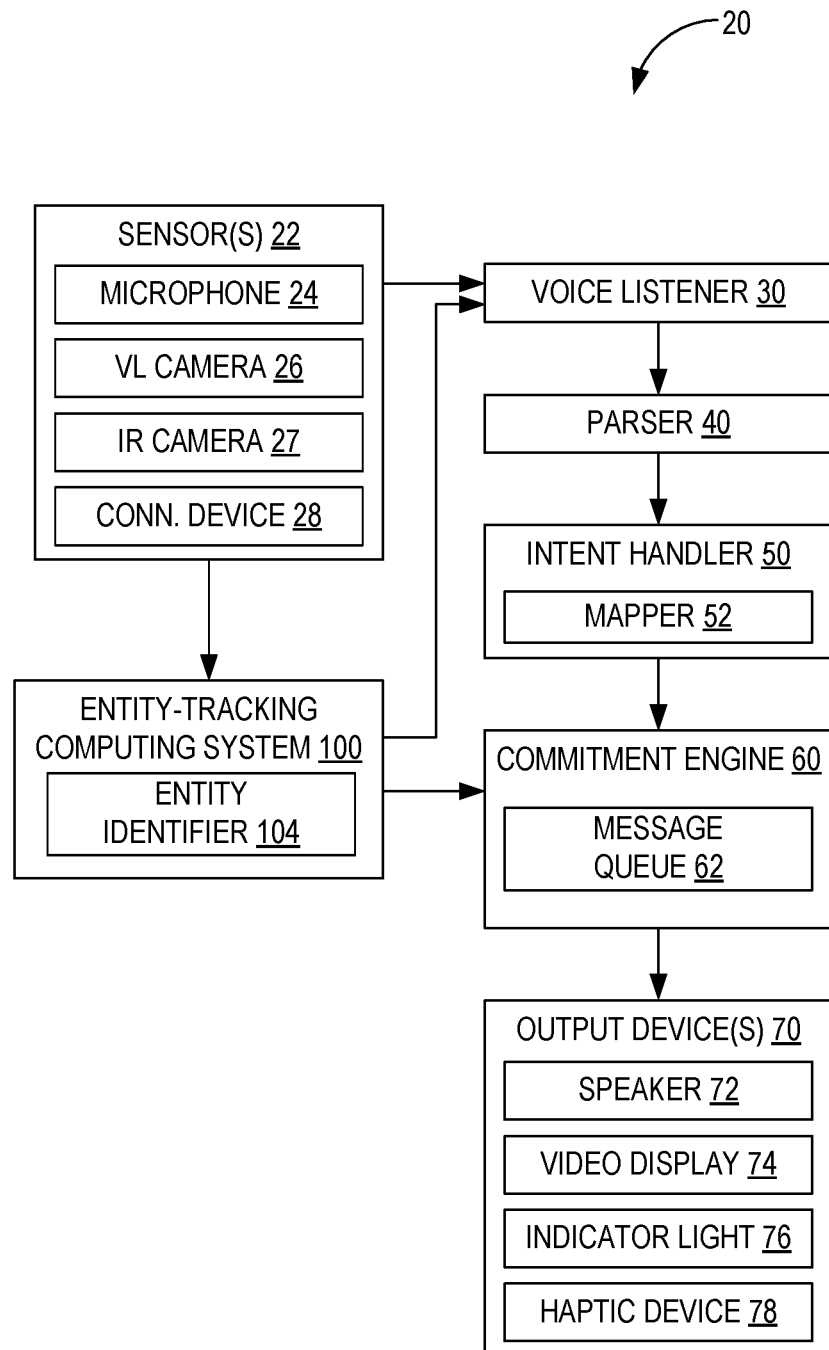
FIG. 6 schematically shows an example logical architecture for implementing an intelligent assistant system according to examples of the present disclosure.

With reference now to FIG. 6, following is a description of an example logical architecture for implementing an intelligent assistant system 20 capable of recognizing and responding to natural language inputs according to examples of the present disclosure. As described in more detail below, in various examples the system 20 may be implemented in a single, all-in-one computing device, such intelligent assistant device 10, across two or more devices, in a cloud-supported network, and in combinations of the foregoing.

In this example the intelligent assistant system 10 includes at least one sensor 22, an entity-tracking computing system 100, a voice listener 30, a parser 40, an intent handler 50, a commitment engine 60, and at least one output device 70. In some examples the sensors 22 may include one or more microphones 24, visible light cameras 26, infrared cameras 27, and connectivity devices 28, such as Wi-Fi or Bluetooth modules. In some examples sensor(s) 22 may comprise stereoscopic and/or depth cameras, head trackers, eye trackers, accelerometers, gyroscopes, gaze detection devices, electric-field sensing componentry, GPS or other location tracking devices, temperature sensors, device state sensors, and/or any other suitable sensor.

The entity-tracking computing system 100 is configured to detect entities and their activities, including people, animals, or other living things, as well as non-living objects. Entity-tracking computing system 100 includes an entity identifier 104 that is configured to recognize humans, individual users and/or non-living objects. Voice listener 30 receives audio data and utilizes speech recognition functionality to translate spoken utterances into text. Voice listener 30 also may assign confidence value(s) to the translated text, and may perform speaker recognition to determine an identity of the person speaking, as well as assign probabilities to the accuracy of such identifications. Parser 40 analyzes text and confidence values received from voice listener 30 to derive user intentions and generate corresponding machine-executable language.

Intent handler 50 receives machine-executable language representing user intentions from the parser 40, and resolves missing and ambiguous information to generate commitments. Commitment engine 60 stores commitments from the intent handler 50. At a contextually appropriate time, the commitment engine may deliver one or more messages and/or execute one or more actions that are associated with one or more commitments. Commitment engine 60 may store messages in a message queue 62 or cause one or more output devices 70 to generate output. The output devices 70 may comprise one or more of speaker(s) 72, video display(s) 74, indicator light(s) 76, haptic device(s) 78, and/or other suitable output devices. In other examples, output devices 70 may comprise one or more other devices or systems, such as home lighting, thermostats, media programs, door locks, etc., that may be controlled via actions executed by the commitment engine 60.

In different examples the voice listener 30, parser 40, intent handler 50, commitment engine 60, and/or entity-tracking computing system 100 may be embodied in software that is stored in memory and executed by one or more processors of a computing device. In some implementations, specially programmed logic processors may be utilized to increase the computational efficiency and/or effectiveness of the intelligent assistant device. Additional details regarding the components and computing aspects of computing devices that may store and execute these modules are described in more detail below with reference to FIG. 19.

In some examples the voice listener 30 and/or commitment engine 60 may receive context information including associated confidence values from entity-tracking computing system 100. As described in more detail below, entity-tracking computing system 100 may determine an identity, position, and/or current status of one or more entities within range of one or more sensors, and may output such information to one or more other modules, such as voice listener 30, commitment engine 60, etc. In some examples, entity-tracking computing system 100 may interpret and evaluate sensor data received from one or more sensors, and may output context information based on the sensor data. Context information may include the entity-tracking computing system's guesses/predictions as to the identity, position, and/or status of one or more detected entities based on received sensor data. In some examples, the guesses/predictions may additionally include a confidence value defining the statistical likelihood that the information is accurate.

Figure 7:
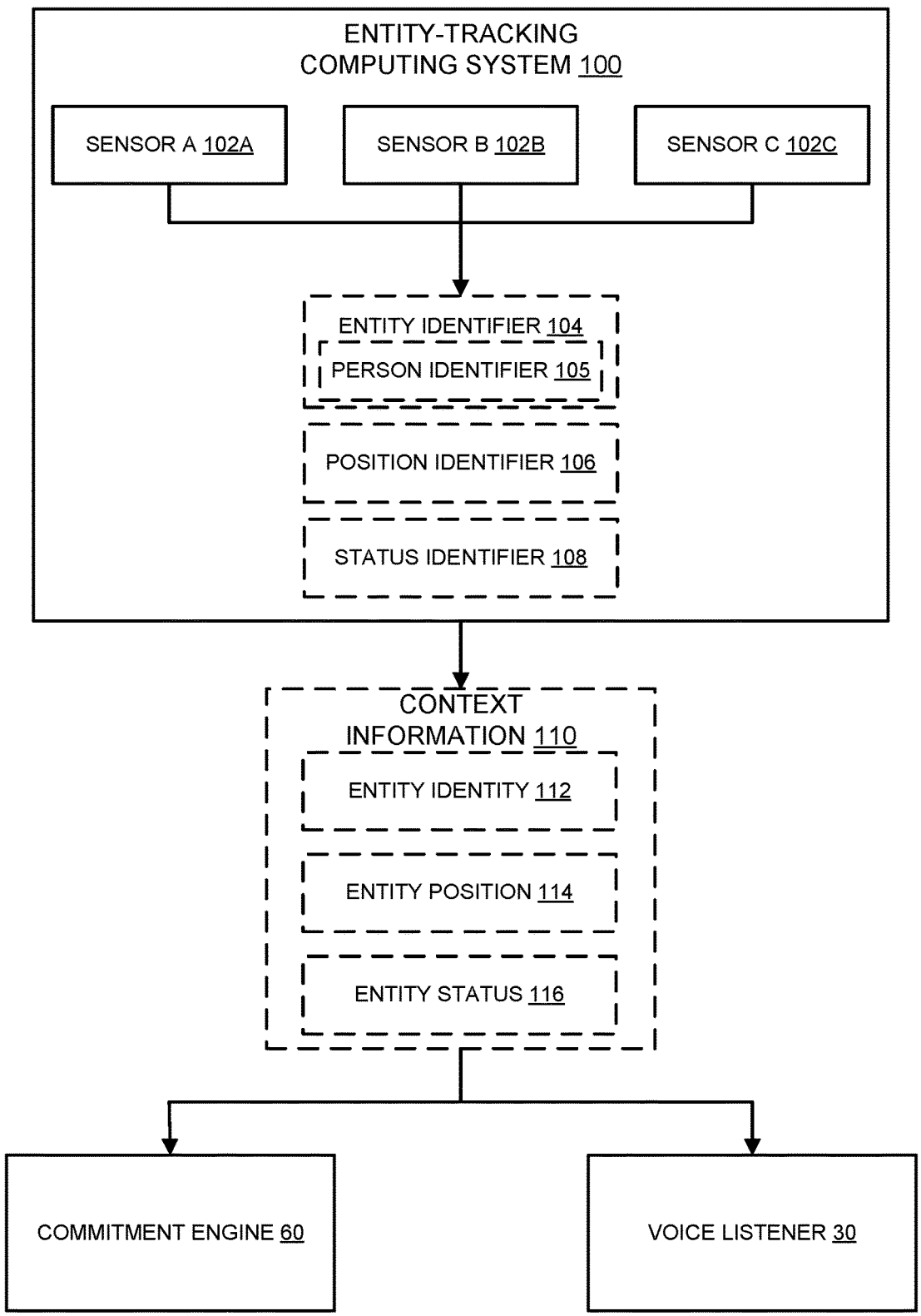
FIG. 7 schematically shows an entity-tracking computing system that may determine an identity, position, and/or current status of one or more entities according to examples of the present disclosure.

FIG. 7 schematically illustrates an example entity-tracking computing system 100 that may, in some examples, comprise a component of the intelligent assistant system 20. Entity-tracking computing system 100 may be used to determine an identity, position, and/or current status of one or more entities within range of one or more sensors. Entity-tracking computing system 100 may output such information to one or more other modules of intelligent assistant system 20, such as the commitment engine 60, voice listener 30, etc.

The word "entity" as used in the context of the entity-tracking computing system 100 may refer to people, animals, or other living things, as well as non-living objects. For example, the entity-tracking computing system may be configured to identify furniture, appliances, autonomous robots, structures, landscape features, vehicles, and/or any other physical object, and determine the position/location and current status of such physical objects. In some cases, the entity-tracking computing system 100 may be configured to only identify people and not other living or non-living things. In such cases, the word "entity" may be synonymous with the words "person" or "human."

Entity-tracking computing system 100 receives sensor data from one or more sensors 102, such as sensor A 102A, sensor B 102B, and sensor C 102C, though it will be understood that an entity-tracking computing system may be used with any number and variety of suitable sensors. As examples, sensors usable with an entity-tracking computing system may include cameras (e.g., visible light cameras, UV cameras, IR cameras, depth cameras, thermal cameras), microphones, directional microphone arrays, pressure sensors, thermometers, motion detectors, proximity sensors, accelerometers, global positioning satellite (GPS) receivers, magnetometers, radar systems, lidar systems, environmental monitoring devices (e.g., smoke detectors, carbon monoxide detectors), barometers, health monitoring devices (e.g., electrocardiographs, sphygmomanometers, electroencephalographs), automotive sensors (e.g., speedometers, odometers, tachometers, fuel sensors), and/or any other sensors or devices that collect and/or store information pertaining to the identity, position, and/or current status of one or more people or other entities. In some examples, such as in intelligent assistant device 10, the entity-tracking computing system 100 may occupy a common device housing with one or more of the plurality of sensors 102. In other examples, the entity-tracking computing system 100 and its associated sensors may be distributed across multiple devices configured to communicate via one or more network communications interfaces (e.g., Wi-Fi adapters, Bluetooth interfaces).

As shown in the example of FIG. 7, entity-tracking computing system 100 may include an entity identifier 104, a person identifier 105, a position (location) identifier 106, and a status identifier 108. In some examples, the person identifier 105 may be a specialized component of the entity identifier 100 that is particularly optimized for recognizing humans, as opposed to other creatures and non-living things. In other cases, the person identifier 105 may operate separately from the entity identifier 104, or the entity-tracking computing system 100 may not include a dedicated person identifier.

Depending on the specific implementation, any or all of the functions associated with the entity identifier, person identifier, position identifier, and status identifier may be performed by the individual sensors 102A-102C. Though the present description generally describes the entity-tracking computing system 100 as receiving data from sensors, this does not require that the entity identifier 104, as well as other modules of the entity-tracking computing system, must be implemented on a single computing device that is separate and distinct from the plurality of sensors associated with the entity-tracking computing system. Rather, functions of the entity-tracking computing system 100 may be distributed amongst the plurality of sensors, or other suitable devices. For example, rather than sending raw sensor data to the entity-tracking computing system, individual sensors may be configured to attempt to identify entities that they detect, and report this identification to the entity-tracking computing system 100, and/or other modules of intelligent assistant system 20. Furthermore, to simplify descriptions below, the term "sensor" is sometimes used to describe not only the physical measurement device (e.g., microphone or camera), but also the various logic processors configured and/or programmed to interpret signals/data from the physical measurement devices. For example, a "microphone" may be used to refer to the device that translates acoustic energy to an electrical signal, the analog-to-digital converter that converts the electrical signal to digital data, the on-board application-specific-integrated-circuit that pre-processes the digital data, and the downstream modules described herein (e.g., entity-tracking computing system 100, entity identifier 104, voice listener 30, or parser 40). As such, reference to a generic "sensor" or a particular sensor (e.g., "microphone" or "camera") should not be construed to mean only the physical measurement device, but also the cooperating modules/engines, which can be distributed across one or more computers.

Each of the entity identifier 104, person identifier 105, position identifier 106, and status identifier 108 is configured to interpret and evaluate sensor data received from the plurality of sensors 102, and to output context information 110 based on the sensor data. Context information 110 may include the entity-tracking computing system's guesses/predictions as to an identity, position, and/or status of one or more detected entities based on received sensor data. As will be described in more detail below, each of the entity identifier 104, person identifier 105, position identifier 106, and status identifier 108 may output their predictions/identifications along with a confidence value.

The entity identifier 104, person identifier 105, position identifier 106, status identifier 108, and other processing modules described herein may utilize one or more machine-learning technologies. Non-limiting examples of such machine-learning technologies can include Feedforward Networks, Recurrent Neural Networks (RNN), Long Short-term Memory (LSTM), Convolutional Neural Networks, Support-vector Machines (SVM), Generative-Adversarial Networks (GAN), Variational Autoencoders, Q-Learning, and Decision Trees. The various identifiers, engines, and other processing blocks described herein may be trained via supervised and/or unsupervised learning utilizing these, or any other appropriate, machine learning technologies to make the described assessments, decisions, identifications, etc.

The entity identifier 104 may output an entity identity 112 of a detected entity, and such entity identity may have any suitable degree of specificity. In other words, based on received sensor data, the entity-tracking computing system 100 may predict the identity of a given entity, and output such information as entity identity 112. For example, the entity identifier 104 may report that a particular entity is a human, a piece of furniture, a dog, etc. Additionally, or alternatively, the entity identifier 104 may report that a particular entity is an oven with a particular model number; a pet dog with a specific name and breed; an owner or known user of intelligent assistant device 10, with the owner/known user having a particular name and profile. In different examples entities can be identified in any of a variety of suitable ways, potentially involving facial recognition, voice recognition, detecting presence of portable computing devices associated with known entities, evaluating human height, weight, body shape, gait, hairstyle and/or shoulder shape, etc.

In some examples, the entity identifier 104 may determine two or more levels of identity of a person. Such levels of identity may correspond to one or more thresholds of certainty of the identity that are represented by confidence values. For example, such levels of identity may include an initial identity that corresponds to a previously-identified human and represents an initial confidence value, and a verified identity that represents a verified confidence value greater than the initial confidence value that the person is the previously-identified human. For example, an initial identity of a human may be determined where the associated confidence value maps to at least a 99.0000% likelihood that the person is the previously-identified human. A verified identity of a human may be determined where the associated confidence value maps to at least a 99.9990% likelihood that the person is the previously-identified human. For example, a verified identity may be required to authenticate a person to an enterprise-level of security to access particularly sensitive data, such as bank accounts, confidential corporate information, health-related information, etc. In some examples, the degree of specificity with which the entity identifier 104 identifies/classifies detected entities may depend on one or more of user preferences and sensor limitations. In some cases, the entity identity output by the entity identifier may simply be a generic identifier that provides no information regarding the nature of the tracked entity, but rather is used to distinguish one entity from another.

When applied to people, the entity-tracking computing system 100 may in some cases collect information about individuals whom it is unable to identify by name. For example, the entity identifier 104 may record images of a person's face, and associate these images with recorded audio of the person's voice. Should the person subsequently speak to or otherwise address the intelligent assistant system 20, the entity-tracking computing system 100 will then have at least some information regarding with whom the intelligent assistant device is interacting. In some examples, the intelligent assistant system 20 could also prompt the person to state their name, so as to more easily identify the person in the future.

In some examples, the intelligent assistant device 10 may utilize a person's identity to customize a user interface for the person. In one example, a user may be identified who has limited visual capabilities. In this example and based on this identification, a display of the intelligent assistant device 10 (or other device with which the user is interacting) may be modified to display larger text, or to provide a voice-only interface.

The position identifier 106 may be configured to output an entity position (i.e., location) 114 of a detected entity. In other words, the position identifier 106 may predict the current position of a given entity based on collected sensor data, and output such information as entity position 114. As with the entity identity 112, the entity position 114 may have any suitable level of detail, and this level of detail may vary with user preferences and/or sensor limitations. For example, the position identifier 106 may report that a detected entity has a two-dimensional position defined on a plane such as a floor or wall. In some examples an entity position 114 may be determined with respect to an intelligent assistant device, such as an angular direction or distance from such device. Additionally, or alternatively, the reported entity position 114 may comprise a three-dimensional position of a detected entity within a real world, three-dimensional environment. In some examples an entity position 114 may comprise a GPS position, a location within an environment-relative coordinate system, etc.

The reported entity position 114 for a detected entity may correspond to the entity's geometric center, a particular part of the entity that is classified as being important (e.g., the head of a human), a series of boundaries defining the borders of the entity in three-dimensional space, etc. The position identifier 106 may further calculate one or more additional parameters describing the position and/or orientation of a detected entity, such as a pitch, roll, and/or yaw parameter. In other words, the reported position of a detected entity may have any number of degrees-of-freedom, and may include any number of coordinates defining the position of the entity in an environment. In some examples, an entity position 114 of a detected entity may be reported even if the entity-tracking computing system 100 is unable to identify the entity, and/or determine the current status of the entity.

Status identifier 108 may be configured to output an entity status 116 of a detected entity. In other words, the entity-tracking computing system 100 may be configured to predict the current status of a given entity based on received sensor data, and output such information as entity status 116. "Entity status" can refer to virtually any measurable or classifiable property, activity, or behavior of a given entity. For example, when applied to a person, the entity status of the person can indicate the presence of a person, a height of the person, a posture of the person (e.g., standing, sitting, laying down), a speed at which the person is walking/running, a current activity of the person (e.g., sleeping, watching TV, working, playing a game, swimming, talking on the phone), a current mood of the person (e.g., by evaluating the person's facial expression or tone of voice), biological/physiological parameters of the person (e.g., the person's heart rate, respiration rate, oxygen saturation, body temperature, neurological activity), whether the person has any current or upcoming calendar events/appointments, etc. "Entity status" can refer to additional/alternative properties or behaviors when applied to other creatures or non-living objects, such as a current temperature of an oven or kitchen sink, whether a device (e.g., television, lamp, microwave) is powered on, whether a door is open, etc.

In some examples, the status identifier 108 may use sensor data to calculate a variety of different biological/physiological parameters of a human. This may be done in a variety of suitable ways. For example, the entity-tracking computing system 100 may be configured to interface with an optical heart rate sensor, a pulse oximeter, a sphygmomanometer, electrocardiograph, etc. Additionally or alternatively, the status identifier 108 may be configured to interpret data from one or more cameras and/or other sensors in an environment, and process the data in order to calculate a human's heart rate, respiration rate, oxygen saturation, etc. For example, the status identifier 108 may be configured to utilize Eulerian magnification and/or similar techniques to amplify miniscule movements or changes captured by the cameras, thereby allowing the status identifier to visualize the flow of blood through a human's circulatory system and calculate associated physiological parameters. Such information can be used, for example, to determine when the person is asleep, working out, in distress, experiencing health problems, etc.

Upon determining one or more of the entity identity 112, entity position 114, and entity status 116, such information may be sent as context information 110 to any of a variety of external modules or devices, where it may be used in a variety of ways. For example and as described in more detail below, context information 110 may be used to determine one or more contexts of a human user, and to actuate one or more components of an intelligent assistant device to nonverbally communicate the one or more contexts to the user. Additionally, context information 110 may be used by commitment engine 60 to manage commitments and associated messages and notifications. In some examples, context information 110 may be used by commitment engine 60 to determine whether a particular message, notification, or commitment should be executed and/or presented to a user. Similarly, context information 110 may be utilized by voice listener 30 when interpreting human speech or activating functions in response to a keyword trigger.

As noted above, in some examples the entity-tracking computing system 100 may be implemented in a single computing device, such as intelligent assistant device 10. In other examples, one or more functions of the entity-tracking computing system 100 may be distributed across multiple computing devices working cooperatively. For example, one or more of the entity identifier 104, person identifier 105, position identifier 106, and status identifier 108 may be implemented on different computing devices, while still collectively comprising an entity-tracking computing system configured to perform the functions described herein. As indicated above, any or all of the functions of the entity-tracking computing system may be performed by individual sensors 102. Further, in some examples entity-tracking computing system 100 may omit one or more of the entity identifier 104, person identifier 105, position identifier 106, and status identifier 108, and/or include one or more additional components not described herein, while still providing context information 110. Additional details regarding components and computing aspects that may be used to implement entity-tracking computing system 100 are described in more detail below with respect to FIG. 19.

Each of entity identity 112, entity position 114, and entity status 116 may take any suitable form. For example, each of the entity identity 112, position 114, and status 116 may take the form of a discrete data packet including a series of values and/or labels describing the information gathered by the entity-tracking computing system. Each of the entity identity 112, position 114, and status 116 may additionally include a confidence value defining a statistical likelihood that the information is accurate. For example, if the entity identifier 104 receives sensor data that strongly indicates that a particular entity is a human male named "John Smith," then entity identity 112 may include this information along with a corresponding relatively high confidence value, such as 90% confidence. If the sensor data is more ambiguous, then the confidence value included in entity identity 112 correspondingly may be relatively lower, such as 62%. In some examples, separate predictions may be assigned separate confidence values. For example, the entity identity 112 may indicate with 95% confidence that a particular entity is a human male, and indicate with 70% confidence that the entity is John Smith. Such confidence values (or probabilities) may be utilized by a cost function in generating cost calculations for providing messages or other notifications to a user and/or performing action(s).

In some implementations, the entity-tracking computing system 100 may be configured to combine or fuse data from multiple sensors in order to determine context information 100 and corresponding contexts, and to output more accurate predictions. As an example, a camera may locate a person in a particular room. Based on the camera data, the entity-tracking computing system 100 may identify the person with a confidence value of 70%. However, the entity-tracking computing system 100 may additionally receive recorded speech from a microphone. Based on the recorded speech alone, the entity-tracking computing system 100 may identify the person with a 60% confidence value. By combining the data from the camera with the data from the microphone, the entity-tracking computing system 100 may identify the person with a higher confidence value than would be possible using the data from either sensor alone. For example, the entity-tracking computing system may determine that the recorded speech received from the microphone corresponds to lip movements of the person visible to the camera when the speech was received, and thereby conclude with relatively high confidence, such as 92%, that the person visible to the camera is the person speaking. In this manner, the entity-tracking computing system 100 may combine the confidence values of two or more predictions to identify a person with a combined, higher confidence value.

In some examples, data received from various sensors may be weighted differently depending upon a reliability of the sensor data. This can be especially relevant in situations where multiple sensors are outputting seemingly inconsistent data. In some examples, the reliability of a sensor's data may be based at least in part on the type of data generated by the sensor. For example, in some implementations a reliability of video data may be weighted higher than a reliability of audio data, as the presence of an entity on camera may be a more reliable indicator of its identity, position, and/or status than recorded sounds that are presumed to originate from the entity. It will be appreciated that a reliability of sensor data is a different factor than a confidence value associated with a predicted accuracy of an instance of data. For example, several instances of video data may have different confidence values based on different contextual factors present at each instance. Each of these instances of video data, however, may be associated with a single reliability value for video data in general.

In one example, data from a camera may suggest that a particular person is in a kitchen with a 70% confidence value, such as via face recognition analysis. Data from a microphone may suggest with a 75% confidence value that the same person is in a nearby hallway, such as via voice recognition analysis. Even though the instance of microphone data carries a higher confidence value, the entity-tracking computing system 100 may output a prediction that the person is in the kitchen based on a higher reliability of the camera data as compared to a lower reliability of the microphone data. In this manner and in some examples, different reliability values for different sensor data may be used along with confidence values to reconcile conflicting sensor data and determine an identity, position, and/or status of an entity.

Additionally, or alternatively, more weight may be given to sensors that have higher precision, more processing power or otherwise greater capabilities. For example, a professional-grade video camera may have a significantly improved lens, image sensor, and digital image processing capabilities as compared to a basic webcam found in a laptop. Accordingly, a higher weight/reliability value may be given to video data received from the professional-grade camera as compared to the webcam, as such data is likely to be more accurate.

Figure 8:
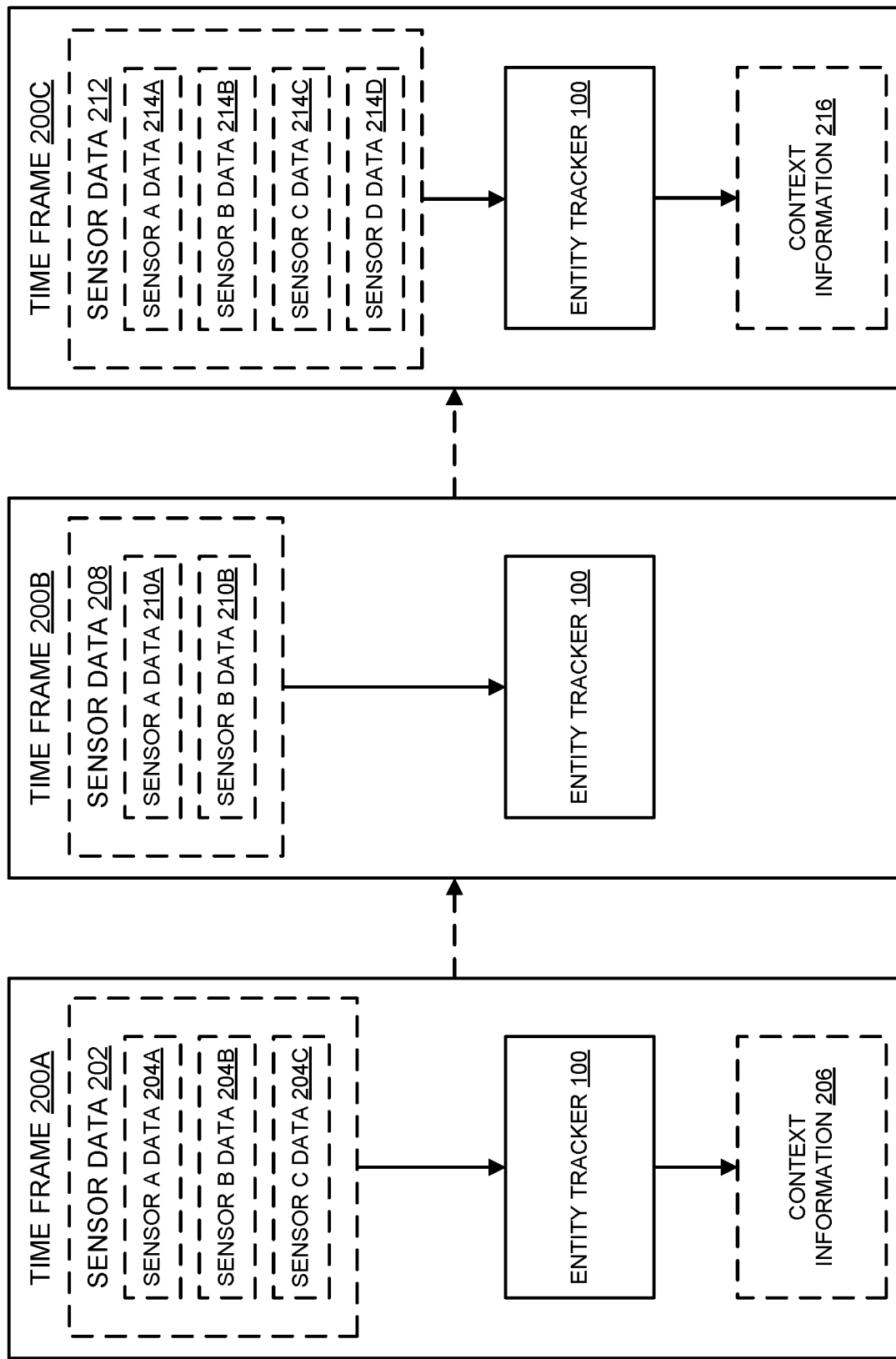
FIG. 8 schematically shows an entity-tracking computing system receiving and interpreting sensor data over multiple time frames according to examples of the present disclosure.

With reference now to FIG. 8, in some examples, individual sensors used with the entity-tracking computing system 100 may output data with a different frequency than other sensors used with the entity-tracking computing system. Similarly, sensors used with the entity-tracking computing system 100 may output data with a different frequency than the frequency with which the entity-tracking computing system evaluates the data and outputs context information. In the example of FIG. 8, entity-tracking computing system 100 may receive and interpret sensor data over multiple time frames 200A, 200B, and 200C. A single time frame may represent any suitable length of time, such as $\frac{1}{30}^{th}$ sec., $\frac{1}{60}^{th}$ sec., etc.

In this example, during time frame 200A entity-tracking computing system 100 receives a set of sensor data 202 including sensor A data 204A, sensor B data 204B, and sensor C data 204C. Such sensor data is interpreted by entity-tracking computing system 100 and transformed into context information 206, which may be used to determine an identity, position, and/or status of one or more detected entities as described above. During time frame 200B, entity-tracking computing system 100 receives sensor data 208, including sensor A data 210A and sensor B data 210B. Entity-tracking computing system 100 does not receive data from sensor C during time frame 200B, as sensor C outputs data at a different frequency than sensors A and B. Similarly, entity-tracking computing system 100 does not output context information during time frame 200B, as the entity-tracking computing system outputs context information at a different frequency than sensors A and B.

During time frame 200C, entity-tracking computing system 100 receives sensor data 212, including sensor A data 214A, sensor B data 214B, sensor C data 214C, and sensor D data 214D. Entity-tracking computing system 100 also outputs context information 216 during time frame 200C, which may be based on any or all of the sensor data received by the entity-tracking computing system since context information was last output in time frame 200A. In other words, context information 216 may be based at least in part on sensor data 208 as well as sensor data 212. In some examples, context information 216 may be based at least in part on sensor data 202 and sensor data 208, as well as sensor data 212.

As shown in FIG. 8, after the entity-tracking computing system 100 receives data from a particular sensor, multiple time frames may pass before the entity-tracking computing system receives more data from the same sensor. During these multiple time frames, entity-tracking computing system 100 may output context information. Similarly, the usefulness of data received from a particular sensor may vary from time frame to time frame. For example, at a first time frame the entity-tracking computing system 100 may receive audio data of a particular person speaking via a microphone, and accordingly identify an entity position 114 of the person with a relatively high confidence value. In subsequent time frames, the person may remain at the identified position, but also may have stopped speaking since the first time frame. In this case, the absence of useful data from the microphone may not be a reliable indicator of the absence of the person. Similar issues can arise with other types of sensors. For example, a camera may lose track of a person if he covers his face, or is occluded by an obstacle, such as another person or a moving object. In this case, though current camera data may not suggest the presence of the person, prior instances of camera data may suggest that the person is still located at the previously identified position. In general, while sensor data may reliably indicate the presence of an entity, such data may be less reliable in suggesting the absence of an entity.

Accordingly, the entity-tracking computing system 100 may utilize one or more confidence decay functions, which in different examples may be defined by the entity-tracking computing system and/or by the sensors themselves. A confidence decay function may be applied to sensor data to reduce the entity-tracking computing system's confidence in the data from a particular sensor as time passes since that sensor last positively detected an entity. As an example, after a sensor detects an entity at a particular location, the entity-tracking computing system 100 may report context information 110 indicating that the entity is at the location with relatively high confidence. If after one or more time frames the sensor no longer detects the entity at the location, and unless it subsequently gathers contradictory evidence, the entity-tracking computing system 100 still may report that the entity is at the location, though with a somewhat lower confidence. As time continues to pass since the sensor last detected the entity at the location, it becomes progressively less likely that the entity is still at the location. Accordingly, the entity-tracking computing system 100 may utilize the confidence decay function to progressively decrease the confidence value of its reported context information 110, eventually reaching 0% confidence if no additional sensors detect the entity.

In some cases, different confidence decay functions may be utilized with different sensors and sensor types. A selection of a particular decay function may depend at least in part on particular properties of a sensor. For example, confidence values associated with data from a video camera may decay more rapidly than confidence values associated with data from a microphone, as absence of an entity in a video frame is a more reliable indicator of the entity's absence than silence recorded by a microphone.

Figure 9:
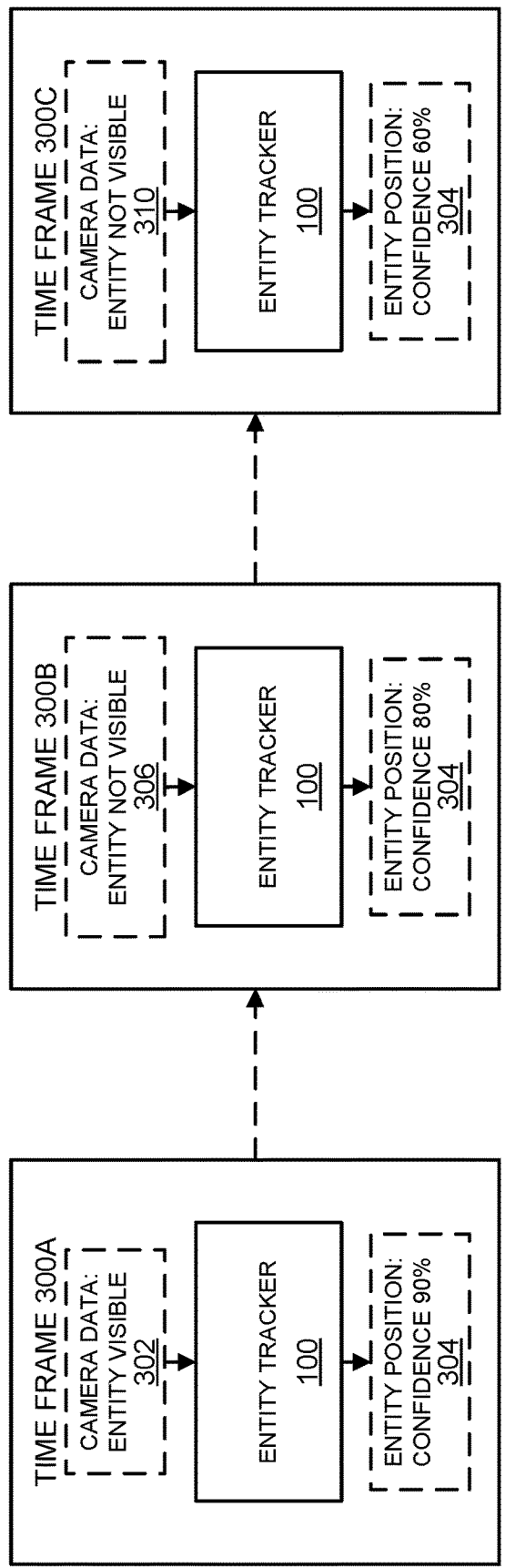
FIG. 9 schematically shows an example of sensor confidence decay over time via an entity-tracking computing system according to examples of the present disclosure.

One example of sensor confidence decay is schematically illustrated in FIG. 9, which shows entity-tracking computing system 100 receiving sensor data during three different time frames 300A, 300B, and 300C. During time frame 300A, entity-tracking computing system 100 receives camera data 302 in which an entity is visible in the frame. Based on this data, the entity-tracking computing system 100 reports the entity position 304 with a 90% confidence value. In time frame 300B, entity-tracking computing system 100 receives camera data 306 in which the entity is no longer visible in the frame. However, it is possible that the entity has not moved, and has merely become occluded, or otherwise undetectable to the camera. Accordingly, entity-tracking computing system 100 reports the same entity position 304, but with a lower confidence value of 80%.

Finally, in time frame 300C entity-tracking computing system 100 receives camera data 310 indicating that the entity is still not visible in the frame. As time has passed, it has grown less likely that the entity is still in the same position. Accordingly, the entity-tracking computing system 100 reports the same entity position 304 with a still lower confidence value of 60%.

In some examples, variable reliability of sensor data may be at least partially addressed by making use of data filtering techniques. In some examples, a Kalman filter may be utilized to filter sensor data. A Kalman filter is a mathematical function that may combine multiple uncertain measurements and output a prediction with more confidence than would be possible using any individual measurement. Each measurement input to the Kalman filter is given a weight based on the measurement's perceived reliability. Kalman filters operate in a two-step process, including a prediction step and an update step. During the prediction step, the filter outputs a prediction based on recent weighted measurements. During the update step, the filter compares its prediction to an actual observed value or state, and dynamically adjusts the weighting applied to each measurement so as to output more accurate predictions.

In some examples, entity-tracking computing system 100 may comprise a Kalman filter that combines data from a variety of sensors to compensate for lower sensor reliability, such as when sensor confidence values have decayed over time since the last positive detection. In some examples, entity-tracking computing system 100 may apply a Kalman filter to sensor data when one or more sensor confidence values are below a predetermined threshold. In an example scenario, image data from a camera may be analyzed using face detection techniques to reliably detect a person in a particular room. In response, the entity-tracking computing system 100 may report with high confidence that the person is located in the room.

In subsequent time frames, the camera may no longer be able to capture and/or positively recognize the person's face in the room. For example, the person's face may become occluded, or the camera may transmit data with a much lower frequency than the entity-tracking computing system 100 outputs context information 110. If the entity-tracking computing system 100 relied exclusively on data from the camera, then the confidence value of its reported position of the person would gradually decrease until the next positive detection. However and in some examples, data from the camera may be supplemented with data from other sensors. For example, during the subsequent time frames a microphone may report that it hears the person's voice in the room, or another sensor may report that it can detect the presence of the person's portable computing device in the room. In such cases, this data may be assigned weights by the Kalman filter, and may be used to predict the person's current location with more confidence than would be possible if only the camera data were used.

In some cases, detection of people and/or other entities in an environment can become more complicated when sensor data is contaminated by background information. Such background information may compromise the confidence with which the entity-tracking computing system 100 reports entity identity 112, position 114, and/or status 116. For example, the intelligent assistant device 10 may need to determine the identity of a person who is speaking in order to appropriately respond to a query or command. Such a determination can be difficult when multiple people are speaking at the same time, a television is playing, loud machinery is operating, etc.

Accordingly, the entity-tracking computing system 100 may use a variety of audio processing techniques to more confidently identify a particular active participant who is engaged in a conversation with other people and/or with the intelligent assistant device 10. As an example, the entity-tracking computing system 100 may implement a voice activity detection (VAD) engine that may distinguish human voices from environmental noise, and identify the presence or absence of human speech.

General-purpose VAD engines may be used for the purpose of classifying a particular segment of audio as including either speech or non-speech, with a corresponding confidence value. An entity-tracking computing system 100 also may utilize a speaker recognition engine to match a particular audio segment with a particular person. As more speech is received, the speaker recognition engine may be progressively tailored to classify the audio as including speech from a particular conversation participant, or not including speech from the particular conversation participant. In this manner, the entity-tracking computing system 100 may recognize speech from one or more particular persons/conversation participants.

Training of a speaker recognition engine may occur any time the entity-tracking computing system 100 has confidently identified a particular person and recorded audio that can be confidently attributed to that person. For example, using camera data, the entity-tracking computing system 100 may identify a particular person and determine that the person's lips are moving. The entity-tracking computing system 100 may simultaneously receive audio from a microphone that can be safely assumed to include speech from the identified person. Accordingly, the received audio can be used to retrain the speaker recognition engine to more specifically recognize the identified person's voice.

In some cases, such retraining may occur only when the person has been identified with a high confidence value (e.g., via accurate facial recognition or any other method), such as a confidence value exceeding a predetermined threshold, and when the entity-tracking computing system 100 has received an audio recording of the person's voice having high volume/amplitude and a high signal-to-noise ratio (S/N). Using this technique, the entity-tracking computing system 100 may accumulate a variety of person-specific voice models, allowing the entity-tracking computing system to more consistently identify speech from particular people and ignore background noise.

Figure 10:
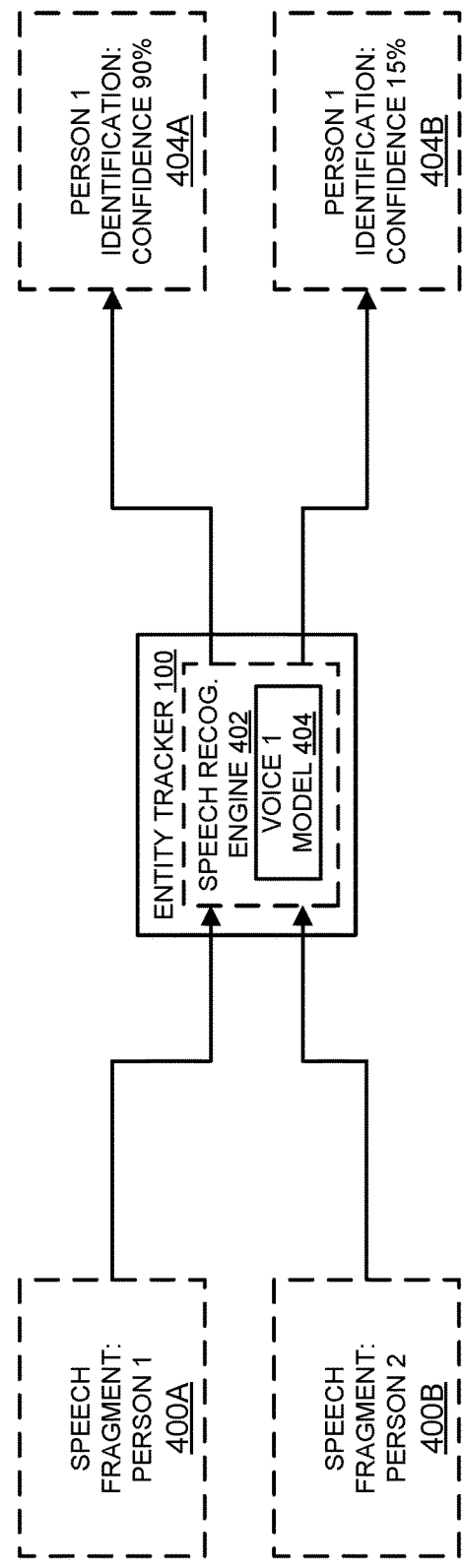
FIG. 10 schematically shows an example of using a trained voice recognition engine to recognize a person's speech according to examples of the present disclosure.

With reference now to FIG. 10, an example of using a trained speech recognition engine to recognize speech from a particular person is schematically illustrated. In this example, entity-tracking computing system 100 receives two speech fragments 400A and 400B. Speech fragment 400A includes recorded speech of a person 1, and speech fragment 400B includes recorded speech of a person 2. Entity-tracking computing system 100 includes a speech recognition engine 402 that has been specifically trained to recognize speech from person 1 using a voice 1 model 404, as described above. Voice 1 model 404 may be applied to each of speech fragment 400A and speech fragment 400B as they are received by the entity-tracking computing system 100.

Upon processing the speech fragments, the entity-tracking computing system 100 outputs a prediction of the likelihood that each speech fragment corresponds to person 1. As shown, for speech fragment 400A, the entity-tracking computing system outputs a person 1 identification 404A with a 90% confidence value, indicating that the speech fragment likely includes speech from person 1. For speech fragment 400B, the entity-tracking computing system outputs a person 1 identification 404B with a 15% confidence value, indicating that speech fragment 400B likely does not include speech from person 1.

In some examples, an entity-tracking computing system 100 may be configured to identify background noise present in an environment, and use audio processing techniques to subtract such background noise from received audio data. For example, a particular device in a person's home may be playing background audio, such as music or television/movie dialogue. Various microphone-equipped devices in the person's home may record such audio. Where such microphone-equipped devices include the intelligent assistant device 10 and/or provide audio data to the entity-tracking computing system 100, such background audio may compromise the ability of the system to identify, interpret and/or respond to human questions or commands.

Accordingly and in some examples, the device playing the background audio and/or another microphone-equipped device recording the background audio may send the captured audio signal to the entity-tracking computing system 100. In this manner, the entity-tracking computing system 100 may subtract the background audio from the audio signal received from the microphone-equipped devices. In some examples, the subtraction of the background audio signal from the recorded audio data may be performed by the device(s) that capture the audio data, or by associated audio-processing components, prior to sending the audio data to the entity-tracking computing system 100.

Additionally or alternatively, devices and/or the entity-tracking computing system 100 may be trained to recognize particular sources of background noise (e.g., from an air vent or refrigerator), and automatically ignore waveforms corresponding to such noise in recorded audio. In some examples, an entity-tracking computing system 100 may include one or more audio-recognition models trained specifically to recognize background noise. For example, audio from various noise databases may be run through supervised or unsupervised learning algorithms in order to more consistently recognize such noise. By allowing the entity-tracking computing system 100 to recognize irrelevant background noise, the ability of the entity-tracking computing system to recognize relevant human speech and other sounds may be improved. In some implementations, positional knowledge of a sound source may be used to focus listening from a directional microphone array.

As indicated above, in some cases an intelligent assistant device as described herein may be configured to track persons or other entities as they move throughout an environment. This may be done, for example, by interpreting data received from a plurality of sensors communicatively coupled to the intelligent assistant device. In some examples, the intelligent assistant device may track one or more entities by maintaining an environment-relative coordinate system to which a field of detection (FOD) of each of a plurality of sensors is mapped. An "environment" as used herein may refer to any real-world area, such as a single room, house, apartment, store, office, building, venue, outdoor space, grid sector, etc.

Figure 11A:
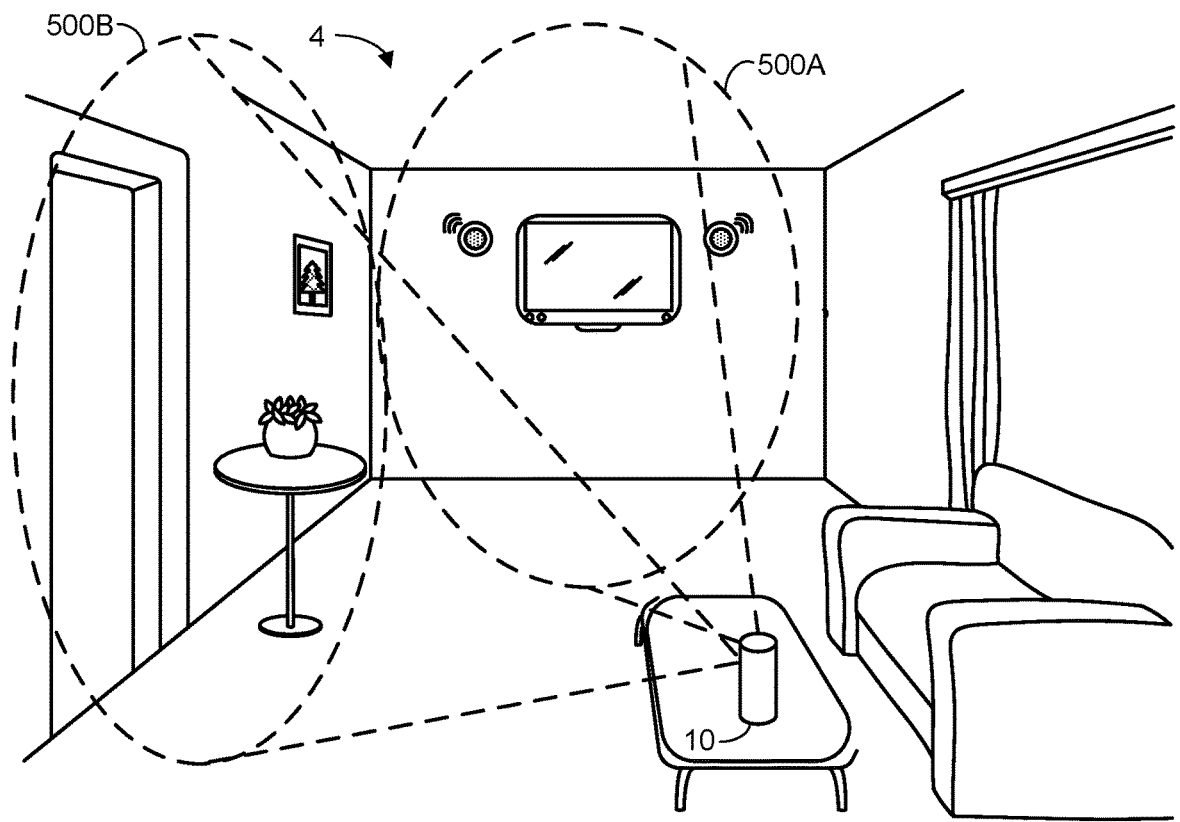
FIGS. 11A and 11B schematically illustrate fields-of-detection (FODs) of sensors of an intelligent assistant device in an environment according to examples of the present disclosure.
Figure 11B:
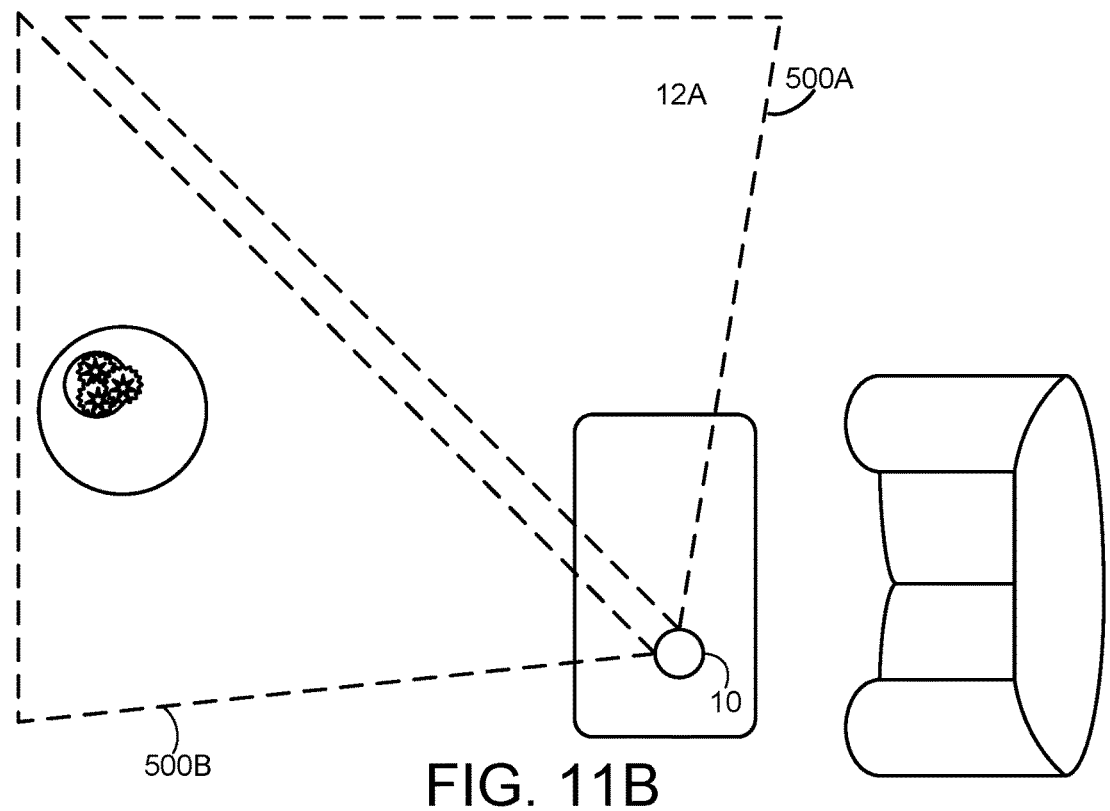

With reference now to FIGS. 11A and 11B, the environment 4 of FIG. 1 is schematically shown along with the intelligent assistant device 10. In these views, a FOD 500A of camera 82A and a FOD 500B of camera 82B of intelligent assistant device 10 are schematically illustrated. Because the sensors shown in FIG. 11A are cameras, FODs 500A and 500B are the fields-of-view (FOVs) of cameras 82A and 82B. In other words, FODs 500A and 500B show the portions of three-dimensional space in which cameras 82A and 82B can detect entities in environment 4. As will be described in more detail below, in some examples upon receiving image data from one or more of the cameras indicating presence of a human, the intelligent assistant device 10 may actuate one or more components (e.g., light source(s), moveable portions, etc.) to non-verbally communicate the presence of the human.

Though the sensors shown in FIGS. 11A and 11B are cameras, as noted above an intelligent assistant device may comprise any of a variety of suitable sensors. As non-limiting examples, such sensors can include visible-light cameras, infrared (IR) cameras, depth cameras, cameras sensitive to other wavelengths of light, microphones, radar sensors, any of the other sensors described herein, and/or any other sensor useable to track an entity. Further, sensors communicating with the intelligent assistant device can assume any suitable orientation.

Accordingly, as indicated above, an intelligent assistant device may maintain an environment-relative coordinate system to which the FODs of sensors in the environment are mapped. This coordinate system may, for example, represent the intelligent assistant device's understanding of the real-world relationships of FODs in the environment. In other words, the FOD of each sensor in the environment may be mapped to the environment-relative coordinate system, such that the intelligent assistant device has an understanding of the real-world areas in which the various sensors can detect entity presence, movement and other context information. The environment-relative coordinate system may additionally include other information pertaining to the environment, such as the physical dimensions of the environment (e.g., the size of a room, building, outdoor space, grid sector), and/or the positions of any furniture, obstacles, doorways, sensors, or other detectable features present within the environment.

It will be understood that the environment-relative coordinate system may take any suitable form, and include any suitable information pertaining to an environment. The environment-relative coordinate system may utilize any suitable scale, grid system, and/or other method for mapping/quantifying an environment, and may use any suitable number of coordinates and parameters to define sensor FOD locations. In some cases, the environment-relative coordinate system may be a two-dimensional coordinate system and define sensor FODs relative to a two-dimensional surface, such as the floor of an environment. In other cases, the environment-relative coordinate system may define sensor FODs in three-dimensional space.

It is also noted that tracking of entities through private environments, such as living spaces, bedrooms, bathrooms, etc., can present potential privacy concerns. Accordingly, all data collected by the intelligent assistant device that may be personal in nature, such as entity positions, appearances, movements, behaviors, communications, etc., will be treated with the utmost respect for entity privacy. In some cases, any or all of the entity tracking techniques described herein may only be performed in response to receiving explicit user permission. For example, a user may specify which sensors are active, the amount and types of data collected by the sensors, which spaces or rooms in an environment are monitored by the entity-tracking computing system, a level of security or encryption to use with data collected by the entity-tracking computing system, whether collected data is stored locally or remotely, etc. In some examples, the user may choose to make use of relatively lower resolution sensors, such as radar sensors, for monitoring sensitive areas in an environment. This can alleviate at least some privacy concerns with regard to entity tracking, allowing the entity-tracking computing device to track entity movements without requiring users to install high-resolution cameras in sensitive areas, such as bathrooms.

As described above, intelligent assistant devices of the present disclosure may detect the presence of a person as well as various context information related to the person. Further, in some examples the incorporation of one or more cameras in the device for sensing one or more types of visual data provides additional capabilities and opportunities for enhanced assistance and interactions with users. More particularly and as previously noted, a person's interactions with another person or entity are enhanced and more informative when non-verbal communications are received from the other party. Accordingly, and with reference now to FIGS. 12A-12C, an example method 600 for communicating non-verbal cues via an intelligent assistant device is disclosed. Method 600 may be performed by intelligent assistant devices 10, 150, 158, 186, and/or all-in-one computing device 160 of FIG. 18, as examples. The following description of method 600 is provided with reference to the software and hardware components described herein and shown in FIGS. 1-11 and 13-19. It will be appreciated that method 600 also may be performed in other contexts using other suitable hardware and software components.

Figure 12A:
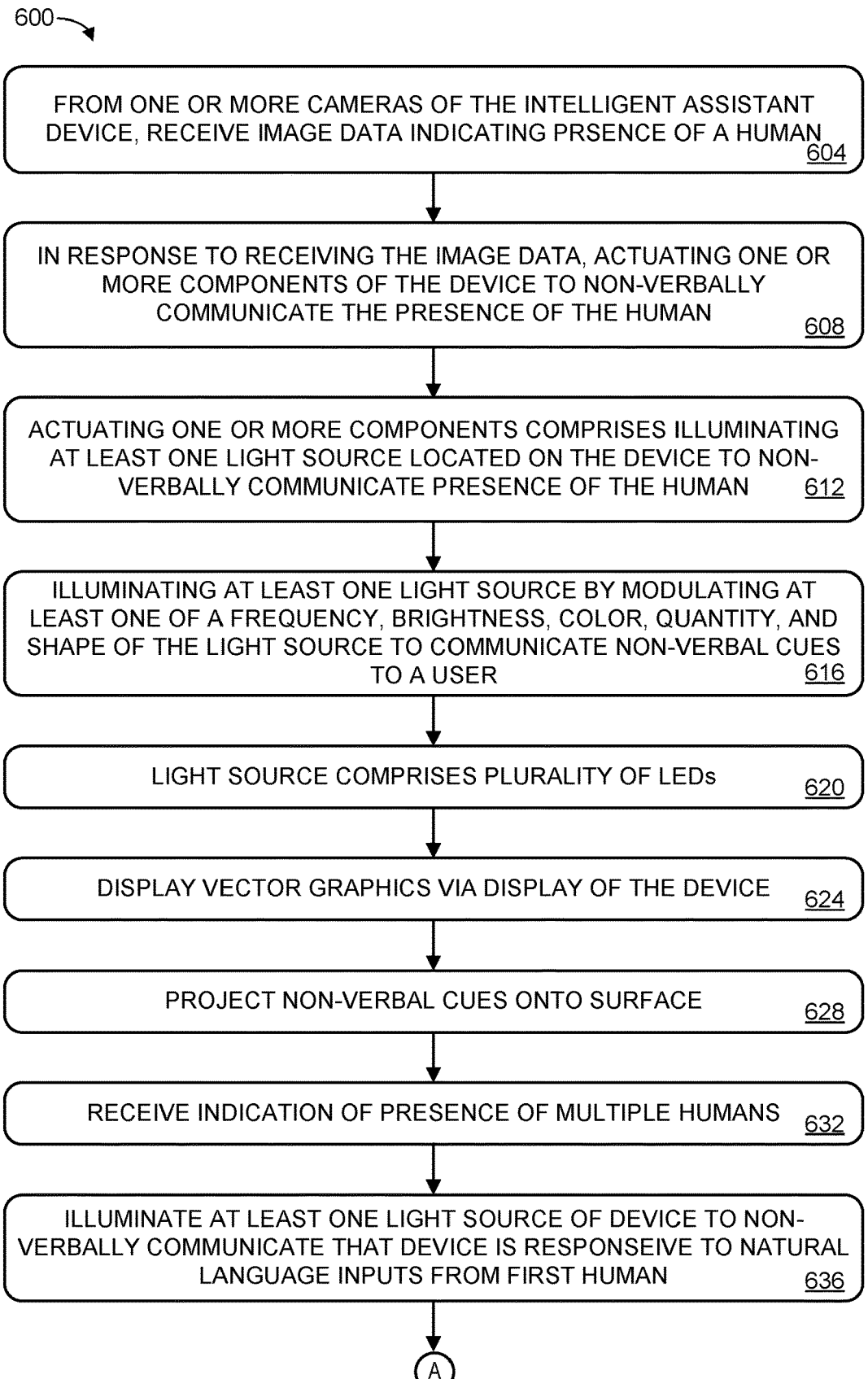
FIGS. 12A, 12B and 12C show a method for communicating non-verbal cues via an intelligent assistant device configured to respond to natural language inputs according to examples of the present disclosure.
Figure 13A:
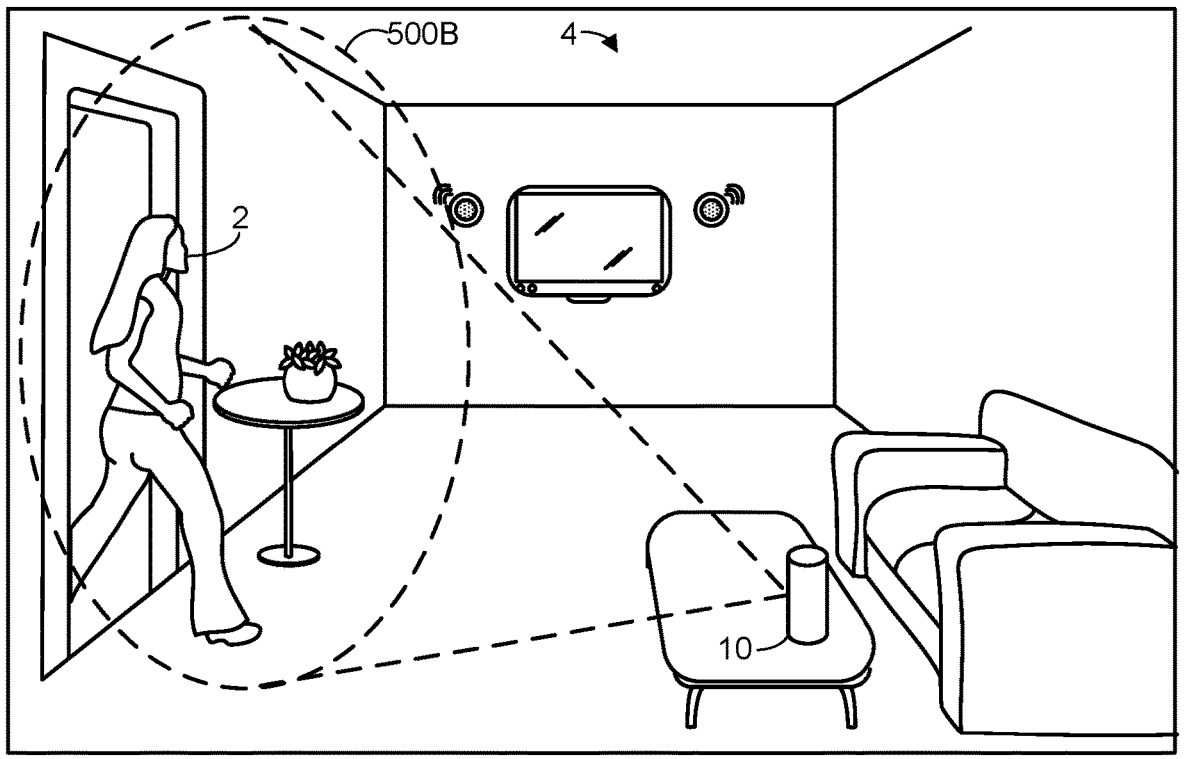
FIGS. 13A and 13B schematically illustrate detection of an entity in a FOD of a sensor.
Figure 13B:
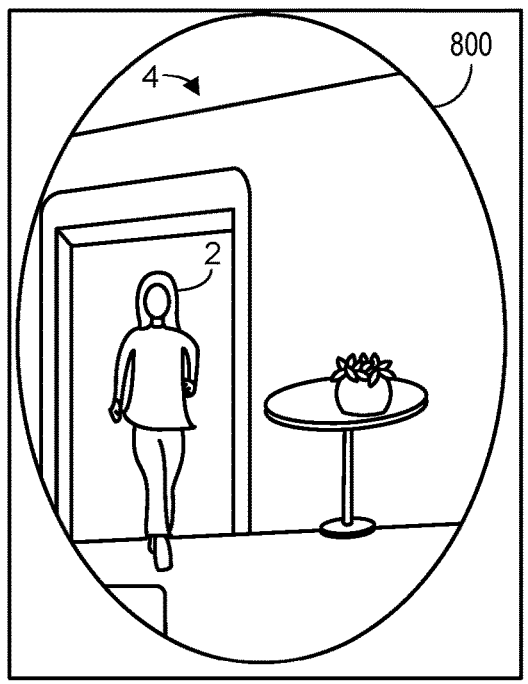

With reference to FIG. 12A, at 604 method 600 may include, from one or more cameras of an intelligent assistant device, receiving image data indicating presence of a human. This is schematically illustrated in FIGS. 13A and 13B, which again show environment 4 of FIG. 1. Specifically, FIG. 13A shows human entity 2 entering FOD 500B of camera 82B of intelligent assistance device 10, while FIG. 10B shows a view 800 of environment 4 from the perspective of camera 82B.

Upon detecting human entity 2 within FOD 500A, the camera may transmit an indication of presence of the detected entity to the intelligent assistance device 10. The indication of entity presence may take any suitable form depending on the implementation and the specific sensors used. In an example scenario, a camera may capture an image of a human face. In some cases, the camera may transmit unprocessed image data to the intelligent assistance device, the image data including one or more pixels corresponding to the face. The transmitted pixels corresponding to the entity therefore represent the indication of presence of the entity, and may be processed by the intelligent assistance device to determine the position and/or identity of the entity. Notably, image data may be transmitted by the camera with any suitable frequency, and need not only be transmitted in response to detecting a candidate entity. In other cases, the camera may perform some degree of processing on the image data, and send a summary or interpretation of the data to the intelligent assistance device. Such a summary may indicate, for example, that a specific, identified human is present at a specific position given by a sensor-relative coordinate system of the sensor. Regardless of the specific form taken by the indication of entity presence, in the example scenario, the data received by the intelligent assistance device may still be useable to identify the human face detected in the FOD of the sensor.

The indication of presence of an entity also may include other forms of data depending where one or more additional sensors detects the entity. For example, when the sensor is a microphone, an indication of entity presence can include recorded audio of the entity's voice or a sensor-relative location of the entity determined via sound processing. When the sensor is a radar sensor, an indication of entity presence can include a silhouette or "blob" formed through detection of radio waves reflecting off the entity. It will be understood that different sensors will detect entity presence in different ways, and an indication of entity presence can take any suitable form depending on the specific sensor(s) used. Further, processing of sensor data may take place on the entity-tracking computing system, on the sensor or related components, and/or distributed among multiple devices or systems.

Returning briefly to FIG. 12A, at 608 the method 600 may include, in response to receiving the image data indicating presence of a human, actuating one or more components of the intelligent assistant device to non-verbally communicate the presence of the human. As described in the examples presented herein, in some examples the one or more components may comprise a single light source or a plurality of light sources. In different examples, a single light source may comprise a light emitting element, such as an LED, or a display, such as an OLED or LCD display. A plurality of light sources may comprise a plurality of light emitting elements, a single display, or a plurality of displays, or various combinations of the foregoing. In this manner and as described in the examples presented below, the person receiving such non-verbal communication is conveniently informed that her presence is detected by the intelligent assistant device. Further, by conveying this useful information via non-verbal communication, the device conveniently and non-intrusively informs the user of this information.

In one example and with reference again to FIG. 12A, at 612 actuating one or more components of the intelligent assistant device to non-verbally communicate the presence of the human may comprise illuminating at least one light source located on the intelligent assistant device. In this manner, a person may be conveniently visually apprised that the intelligent assistant device has detected her presence.

Figure 14:
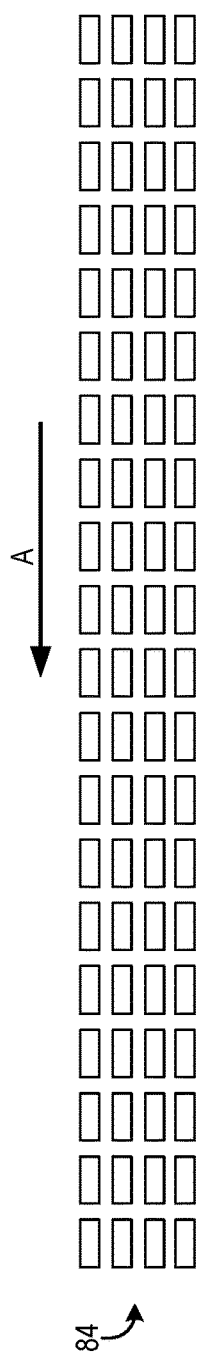
FIG. 14 schematically illustrates an array of light sources on an intelligent assistant device according to examples of the present disclosure.

As described above and with reference again to FIG. 2, in one example the intelligent assistant device 10 comprises a cylindrical enclosure 80 that includes a plurality of light sources 84 that extend around at least a portion of the periphery of the enclosure. FIG. 14 is a schematic illustration showing the array of light sources 84 in an "unwrapped" two-dimensional view for ease of description. In some examples the light sources 84 may extend 360 degrees around the periphery of the enclosure 80 of the intelligent assistant device 10. In other examples, the array may extend around the periphery by 90 degrees, 120 degrees, 180 degrees or any other suitable extent. Additionally, the example of FIG. 14 shows a generally rectangular, 4×20 array of light sources. In other examples, different numbers and arrangements of light sources that are positioned at various locations on the intelligent assistant device 10 may be utilized and are within the scope of the present disclosure. In some examples, different individual light sources may have different shapes, sizes, outputs, and/or other qualities or characteristics.

In some examples and as described in more detail below, to non-verbally communicate the presence of a human, the intelligent assistant device 10 may determine a location of the human relative to the device, and may illuminate at least one light source located on a portion of the device that is facing the human.

Returning briefly to FIG. 12A, in some examples and at 616 the method 600 may include illuminating at least one light source by modulating at least one of a frequency, a brightness, a color, a quantity, and a shape of the at least one light source to communicate non-verbal cues to a user. In some examples and at 620, where the at least one light source is a plurality of light sources, the light sources may be LEDs. In other examples, any other suitable type of light source may be utilized.

With reference again to FIG. 14 and as described in more detail below, in some examples the frequency of one or more of the light sources 84 may be modulated to non-verbally communicate that the intelligent assistant device 10 detects the presence of the human. With reference to the example of FIG. 13A, when the human 2 enters the living room 4, one or more of the light sources 84 may be illuminated to blink or pulsate at a predetermined frequency when image data from a camera of intelligent assistant device 10 indicates the presence of human 2. Additionally and as described in more detail below, in response to determining one or more contexts of the human, such as a location, height or identity of the human, one or more of the light sources may be illuminated to blink or pulsate at a different frequency to non-verbally communicate the one or more contexts of the human. It will be appreciated that a wide variety of techniques of illuminating the light source(s) may be utilized, such as different frequencies and patterns of illumination that create various visual effects, shapes, animations, etc.

In some examples, and in addition to or instead of modulating a frequency of the light source(s), one or more of a brightness, a color, and quantity of the light sources may be modulated. For example, when the human 2 enters the living room 4, one or more of the light sources 84 may be illuminated at an initial brightness to non-verbally communicate the presence of human 2. When one or more other contexts of the human is determined, the one or more of the light sources may be illuminated at a modified and enhanced brightness to non-verbally communicate the one or more contexts of the human.

Similarly, when human 2 enters the living room 4, one or more of the light sources 84 may be illuminated at an initial color (such as blue) to non-verbally communicate the presence of human 2. When another context of the human is determined, the color of the one or more of the light sources may be changed to green to non-verbally communicate the one or more contexts of the human. In another example, the blue light source(s) may be maintained to indicate presence, and another light source(s) may be illuminated in a different color to non-verbally communicate the one or more contexts of the human. In another example, when human 2 enters the living room 4, just one of the light sources 84 may be illuminated to non-verbally communicate the presence of human 2. When another context of the human is determined, a plurality of the light sources may be illuminated to non-verbally communicate the one or more contexts of the human. It will be appreciated that the above examples are provided for illustrative purposes only, and that many variations and combinations of illuminating one or more of the light sources in various manners to communicate non-verbal cues may be utilized and are within the scope of the present disclosure.

Returning briefly to FIG. 12A, at 624 the method 600 may include displaying vector graphics via a display of the intelligent assistant device to communicate non-verbal cues. As noted above with respect to FIG. 3, in some examples one or more light sources may comprise a display 152 that encircles all or a portion of the perimeter of the device's enclosure. In these examples, the display 152 may be utilized to display vector graphics 154, such as a variety of static or animated shapes, patterns, etc., to non-verbally communicate with a user. Accordingly, in some examples one or more shapes generated by the display may be modulated to non-verbally communicate with a user.

Figure 15D:
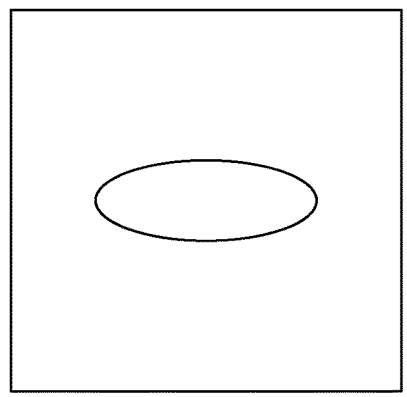
FIGS. 15A-15D schematically show a display device of an intelligent assistant device displaying an animated shape according to examples of the present disclosure.
Figure 15C:
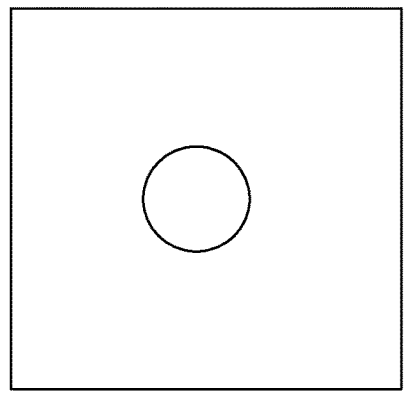
Figure 15B:
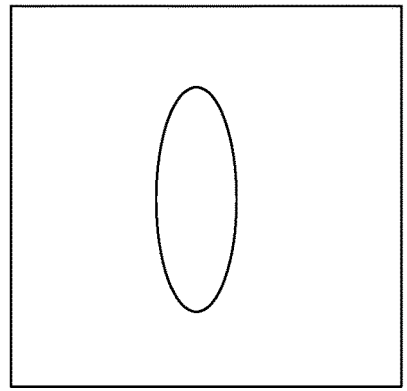
Figure 15A:
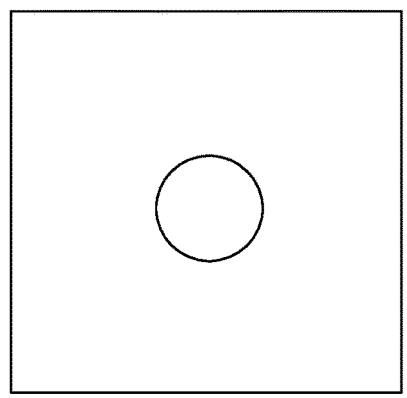

With reference now to FIGS. 15A-15D, in one example the display may animate a shape that morphs from a circle shown in FIG. 15A to a horizontal ellipse in FIG. 15B, back to a circle in FIG. 15C, and then to a vertical ellipse as shown in FIG. 15D. As noted above, in other examples the display may generate a wide variety of shapes and/or patterns, static and/or animated, to non-verbally communicate various cues to a user.

Figure 4:
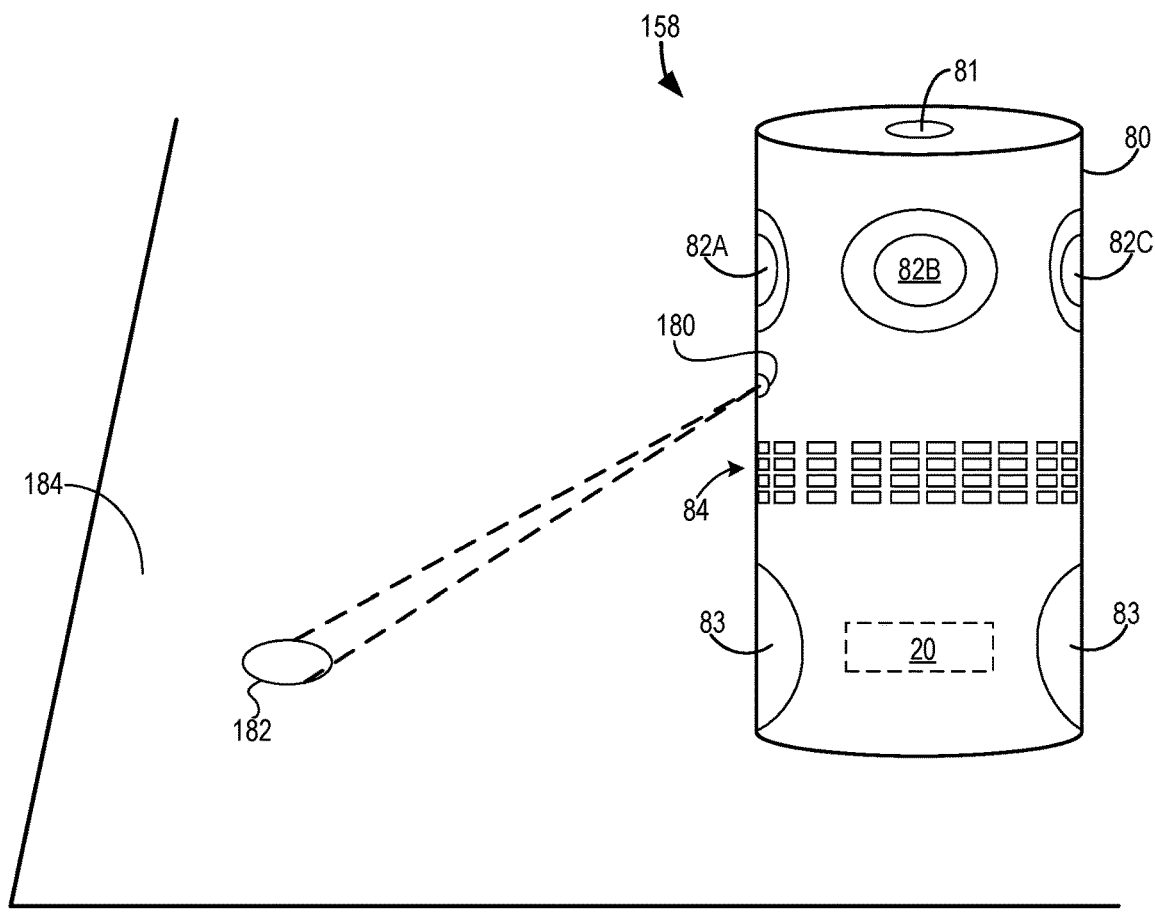
FIG. 4 schematically shows another example of an intelligent assistant device of according to examples of the present disclosure.

Returning briefly to FIG. 12A and at 628, actuating one or more components to non-verbally communicate with a user may comprise projecting non-verbal cues onto a surface. As noted above with respect to FIG. 4, in some examples an intelligent assistant device 158 may include a projector 180 that projects one or more static or animated shapes, patterns, icons, etc., onto a surface. In the example of FIG. 4, projector 180 projects an image of a circle 182 onto the surface 184 of a table on which the device sits.

In some examples, data from one or more sensors of the intelligent assistant device may indicate the presence of multiple people. In these examples and returning briefly to FIG. 12A, at 632 the method 600 may include receiving an indication of presence of multiple people from one or more sensors of the intelligent assistant device. Accordingly and using one or more of the techniques described herein, the intelligent assistant device may individually communicate different non-verbal cues to two or more of the multiple people.

Figure 16:
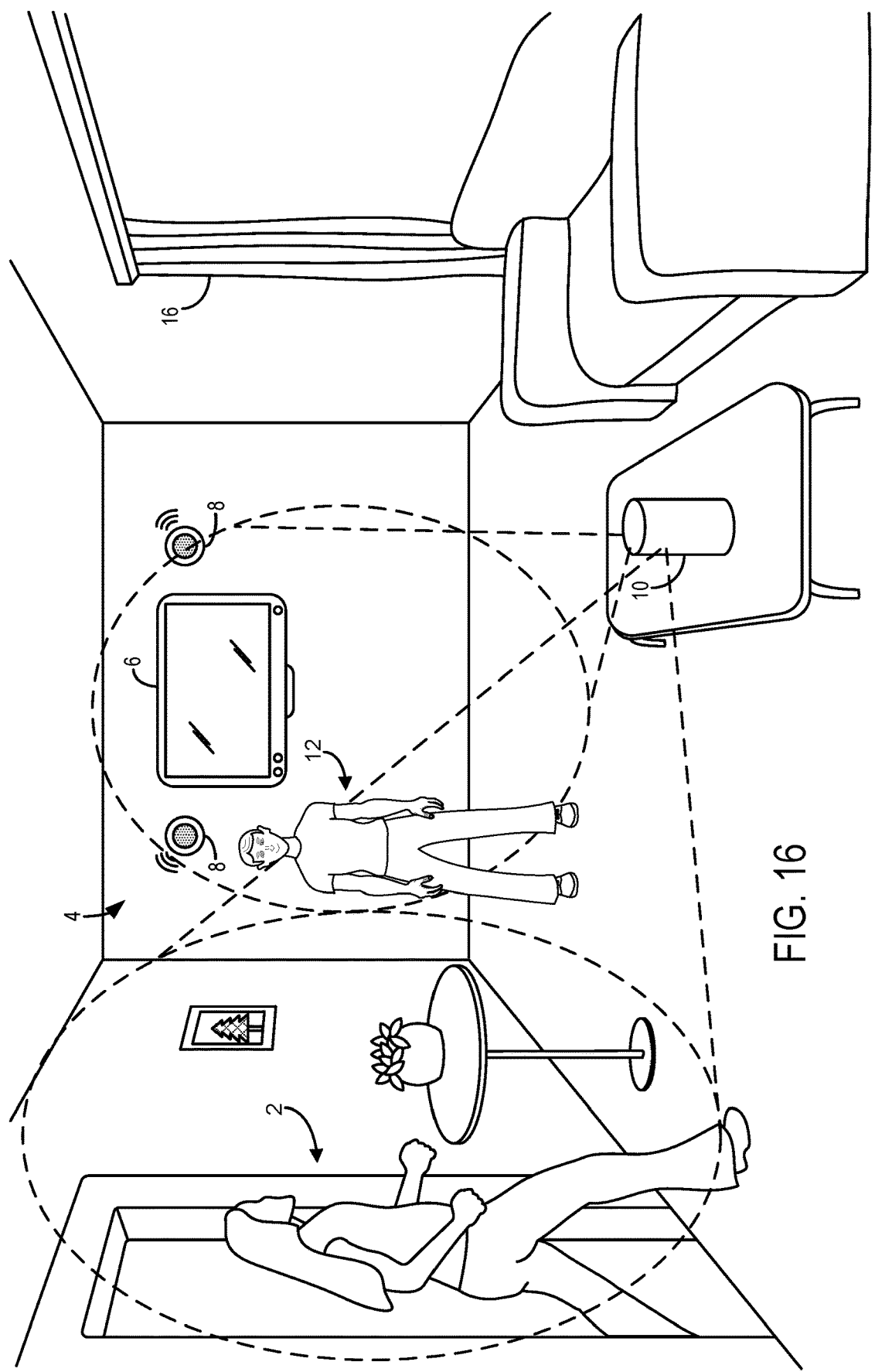
FIG. 16 schematically shows an example in which an intelligent assistant device detects two humans according to examples of the present disclosure.

With reference now to FIG. 16, in one example one or more sensors of the intelligent assistant device 10 may detect a second human 12 as well as the first human 2 in the living room 4. In this example, it may be desirable for the intelligent assistant device to non-verbally convey that it is responsive to the natural language inputs from a particular person; i.e., that a particular person has the "focus" of the device. For example, where first human 2 initiates an engagement with the intelligent communication device, such as by speaking a keyword phrase like "Hey computer," the device may subsequently identify the first human's voice and respond only to commands and queries from the first human. Accordingly and referring briefly to FIG. 12A, at 636 the method 600 may include illuminating at least one light source of the intelligent assistant device to non-verbally communicate that the device is responsive to the natural language inputs from the first human 2. To visually provide such non-verbal cues, the intelligent assistant device may use any of the above-described techniques for illuminating one or more light sources on the device.

In some examples and as noted above, the intelligent assistant device may determine the location of the first human 2 relative to the device. In these examples, the device may illuminate one or more LEDs that are located on a portion of the device that is facing the human to non-verbally communicate the human's location as understood by the device. Additionally and as described in more detail below, the intelligent assistant device may provide other non-verbal communication directed to two or more people to convey additional context and other information, such as location, height and identity of the people.

Figure 12B:
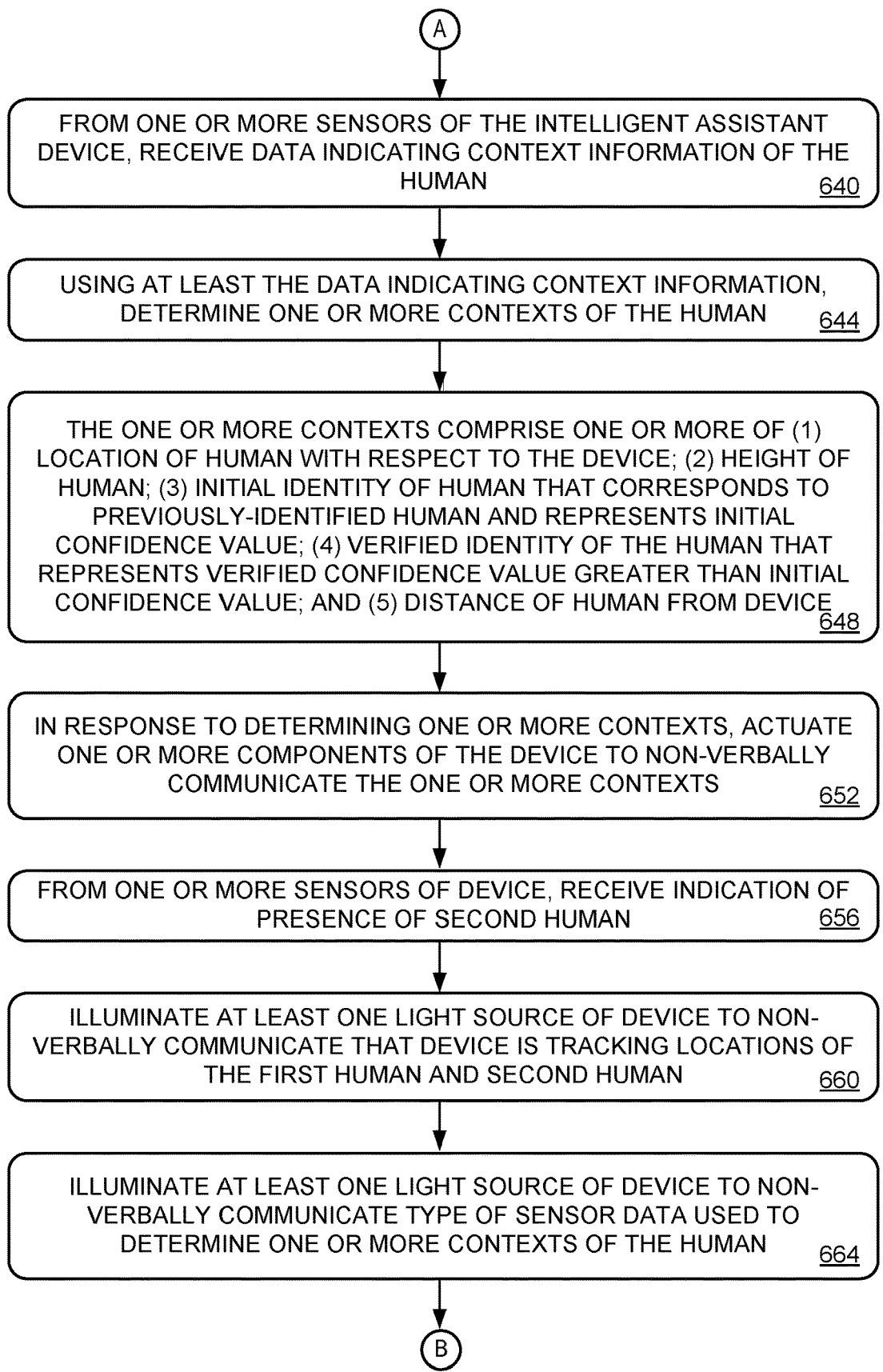
Figure 12C:
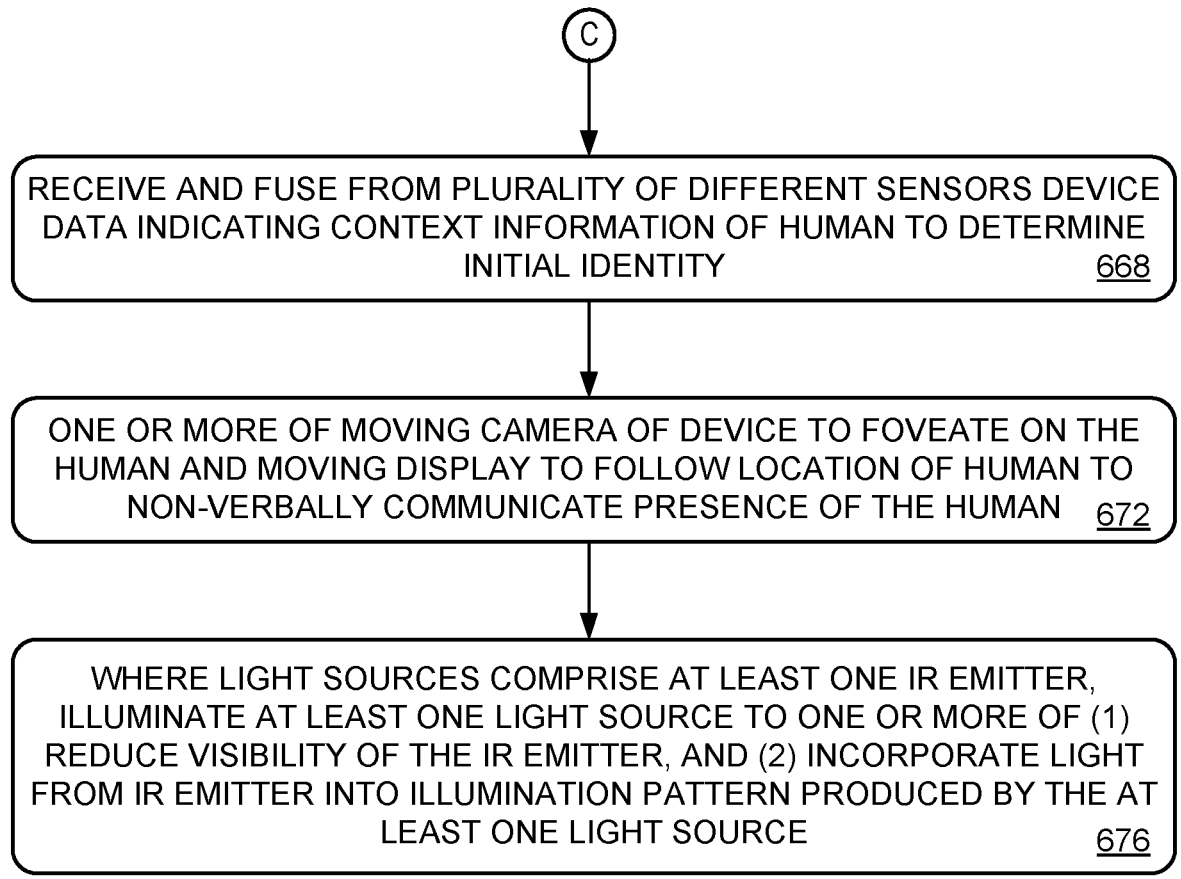

With reference now to FIG. 12B, at 640 the method 600 may include receiving data indicating context information of the human from one or more sensors of the intelligent assistant device. As noted above, context information may include the entity-tracking computing system's guesses/predictions as to the identity, position, and/or status of one or more detected entities based on received sensor data. At 644 the method 600 may include, using at least the data indicating context information of the human, determining one or more contexts of the human. At 648, the one or more contexts of the human may comprise one or more of (1) a location of the human with respect to the intelligent assistant device, (2) a height of the human, (3) an initial identity of the human that corresponds to a previously-identified human and represents an initial confidence value; (4) a verified identity of the human that represents a verified confidence value greater than the initial confidence value; and (5) a distance of the human from the intelligent assistant device.

In some examples and as noted above, a location of one or more humans with respect to the intelligent assistant device may be determined. With reference to the example of FIGS. 16 and 17, image data from cameras of the intelligent assistant device may be used to identify and locate first human 2 and second human 12 relative to the device. For example, the intelligent assistant device 10 may process the image data to generate a sensor-relative position of the detected human within a sensor-relative coordinate system. For example, the sensor-relative position may be given by a set of pixel coordinates relative to a two-dimensional grid of pixels captured by the camera. When the camera is a depth camera, the sensor-relative position of the person may be a three-dimensional position.

As with the indication of entity presence, the sensor-relative position of the entity can take any suitable form. In some examples and in addition to or instead of image data, data from one or more other sensors may be used to determine the location of a person. For example, when the sensor is a microphone, the sensor-relative position may be inferred from an amplitude of the recorded audio signal, thereby serving as an indicator of the person's distance from the sensor. Similarly, as with the environment-relative coordinate system, the sensor-relative coordinate system of each sensor may take any suitable form depending on the type of data collected or observed by the sensor, and may use any scale, grid system, or other suitable method for demarcating/quantifying a sensor's local environment.

In some examples, the sensor-relative position of a detected person may be translated to an environment-relative position of the person within the environment-relative coordinate system. Such translation may rely on a mapping of the FOD of the sensor to the environment-relative coordinate system, as indicated above. This mapping may be achieved in any of a variety of suitable ways, and may be performed at any suitable time. For example, in some cases the mapping of sensor FODs to the environment-relative coordinate system may be performed upon initial setup of intelligent assistant device, gradually developed as the device is used, and/or at another suitable time.

Figure 17:
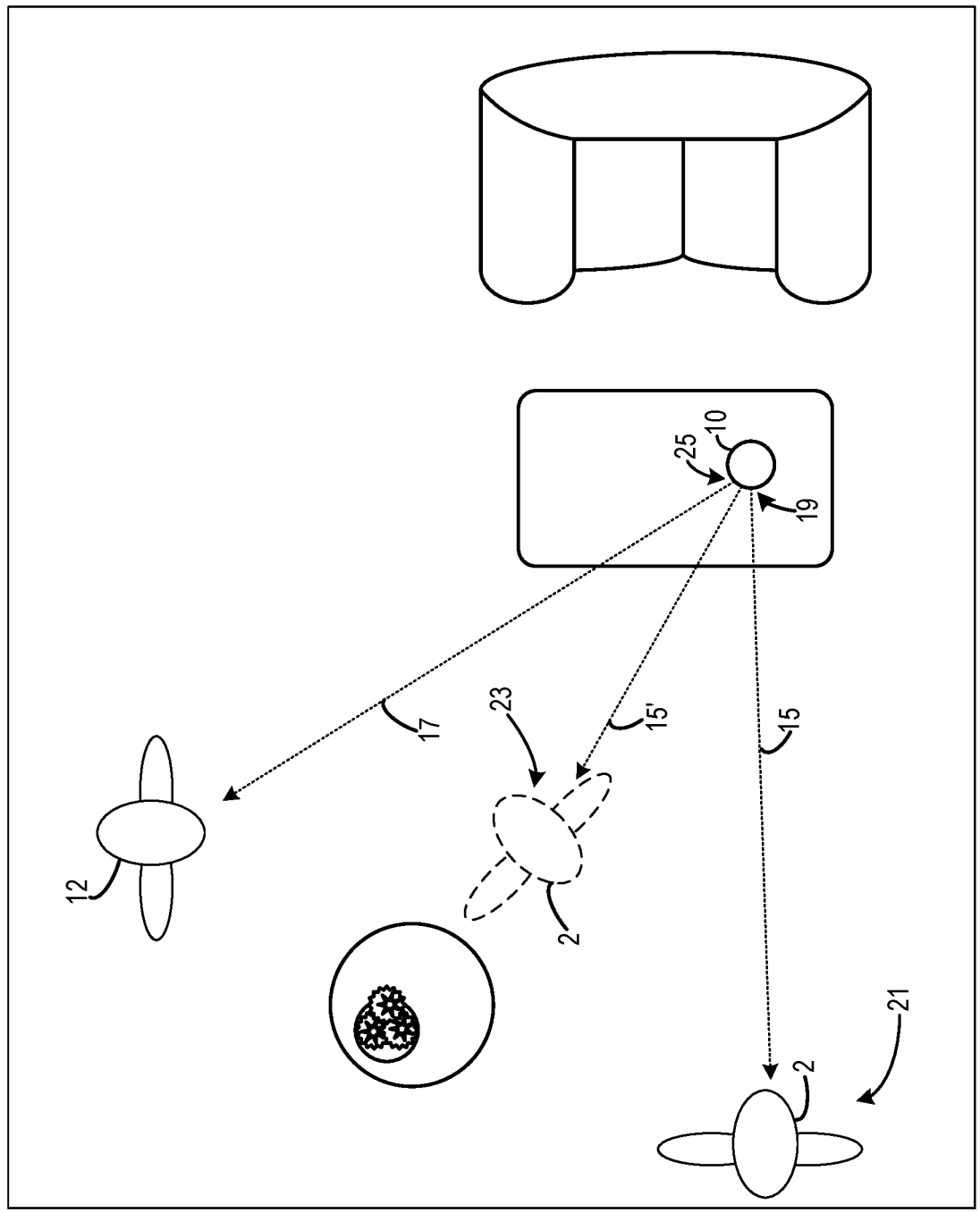
FIG. 17 is a schematic top view of the room of FIG. 16 showing an example in which the intelligent assistant device non-verbally communicates the locations of two people according to examples of the present disclosure.

Referring briefly to FIG. 12B, at 652 the method 600 may include, in response to determining the one or more contexts of the human, actuating one or more components of the intelligent assistant device to non-verbally communicate the one or more contexts of the human. With reference again to FIGS. 16 and 17, where the location of the first human 2 is determined, the intelligent assistant device may non-verbally communicate such location to the person. As schematically shown in FIG. 17, in one example the location of first human 2 may be non-verbally communicated by illuminating one or more LEDs located on a portion 19 of the device 10 that is facing the human, as indicated by dashed line 15.

In some examples, in addition to non-verbally communicating that the intelligent assistant device has detected the first human 2, the device also may communicate that it is tracking the location of the first human. For example and with reference to FIG. 17, as the first human 2 walks from a first location 21 to a second location 23, the intelligent assistant device 10 may progressively illuminate different light sources to non-verbally communicate that the device is tracking the first human's location. In one example and with reference to FIG. 14, as the first human 2 moves in the direction of arrow A relative to the array of light sources 84, which may be LEDs, individual LEDs may be progressively illuminated and darkened from right to left in a manner that follows the changing location of the human, and thereby non-verbally communicates that the device is tracking the human's location.

As noted above, the intelligent assistant device 10 may detect the presence of more than one person. Referring briefly again to FIG. 12B, at 656 the method 600 may include, from one or more sensors of the intelligent assistant device, receiving an indication of presence of a second human. At 660 the method 600 may include illuminating at least one light source of the intelligent assistant device to non-verbally communicate that the intelligent assistant device is tracking the location of the first human and a location of the second human.

In one example and with reference again to FIG. 17, in addition to non-verbally communicating the location of first human 2 by illuminating one or more LEDs as indicated by dashed line 15, in a similar manner the intelligent assistant device 10 also may non-verbally communicate the location of second human 12 by illuminating one or more LEDs on a different portion 25 of the device that is facing the second human 12, as indicated by dashed line 17. As described above with respect to the first human 2, the intelligent assistant device 10 also may progressively illuminate different light sources to non-verbally communicate that the device is also tracking the second human's location.

In some examples, the intelligent assistant device 10 may additionally or alternatively non-verbally communicate a distance of the first human 2 from the device. In one example, the brightness of one or more LEDs illuminated to indicate the person's location may be increased as the user moves closer to the device, and decreased as the user moves further away from the device. It will be appreciated that many other examples of illuminating light sources to non-verbally communicate distance to a person may be utilized.

As noted above, the intelligent assistant device 10 may use the data indicating context information of the human to determine one or more contexts of the human. In some examples, the one or more contexts of the human may comprise a height of the human. In some examples where depth image data from a depth camera is received, the intelligent assistant device may utilize such data to determine the height of a detected human, and may non-verbally communicate an indication of such height by illuminating one or more of its light sources. In one example and with reference to FIG. 14, different detected heights of humans may be generally indicated by illuminating varying numbers of LEDs in a vertical column. For example, for a human who is less than 4 feet tall, 1 LED may be illuminated; for a person between 4 and 5 feet tall, 2 LEDs may be illuminated; for a person between 5 and 6 feet tall, 3 LEDs may be illuminated; and for people over 6 feet tall, all 4 LEDs may be illuminated. It will be appreciated that many other examples of illuminating light sources to non-verbally communicate the height of a human may be utilized.

In some examples and as noted above, the one or more contexts of the human may comprise an initial identity and a verified identity of the human. As explained above, an entity identifier of the intelligent assistant device may determine two or more levels of identity of a person. For example, such levels of identity may include an initial identity that corresponds to a previously-identified human and represents an initial confidence value, and a verified identity that represents a verified confidence value greater than the initial confidence value that the person is the previously-identified human. Where an initial identity is determined, the intelligent assistant device may non-verbally communicate an indication of such identity by illuminating one or more of its light sources in a particular manner.

In one example and with reference to FIG. 14, an initial identity of a human may be indicated by illuminating one or more of the LEDs in a first color, such as blue. Where such human is then authenticated to a verified identity representing a verified confidence value greater than the initial confidence value, such verified identity may be indicated by illuminating the one or more of the LEDs in a second, different color, such as green. It will be appreciated that many other examples of illuminating light sources to non-verbally communicate an initial identity, a verified identity, and/or additional security levels of identity of a human may be utilized.

In some examples, a user of the intelligent assistant device 10 may desire to know what type(s) of data the device is collecting and utilizing. For example, some users may prefer that the device collect or refrain from collecting one or more types of data. In one example and referring briefly again to FIG. 12B, at 664 the method 600 may include illuminating at least one light source of the intelligent assistant device to non-verbally communicate a type of sensor data being used by the intelligent assistant device to determine one or more contexts of the human. For example, where the light source comprises a display on the device, the display may generate vector graphics showing a camera to indicate that video data is being collected by the device. It will be appreciated that many other examples of illuminating light sources to non-verbally communicate a type of sensor data being used by the intelligent assistant device may be utilized.

As noted above, in some examples the intelligent assistant device 10 may receive and utilize a variety of different sensor data from a variety of different sensors on the device. In one example and with reference now to FIG. 12C, at 668 the method 600 may include, wherein the one or more contexts of the human comprise the initial identity of the human, receiving and fusing from a plurality of different sensors of the intelligent assistant device the data indicating context information of the human to determine the initial identity of the human. As noted, in other examples the intelligent assistant device 10 may fuse such data to determine a variety of different contexts of a human as described herein.

Figure 5A:
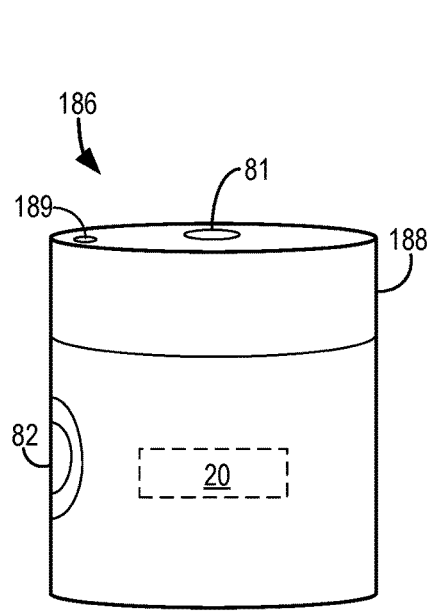
FIGS. 5A and 5B schematically show another example of an intelligent assistant device of according to examples of the present disclosure.
Figure 5B:
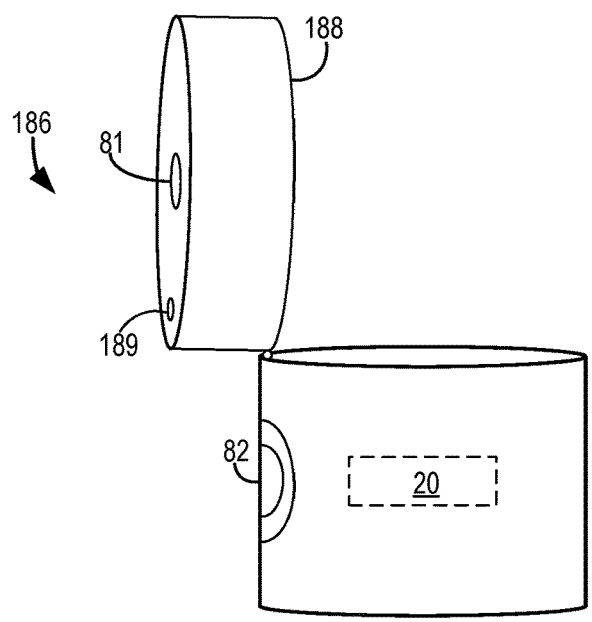

Also as noted above, in some example implementations of an intelligent assistant device, such as the example shown in FIGS. 5A and 5B, one or more components of the device may be actuated by translating, rotating and/or otherwise moving the component to non-verbally communicate the presence of a human. Referring briefly again to FIG. 12C, at 672 the method 600 may include one or more of moving a camera of the device to foveate on the human and moving a display to follow a location of the human to non-verbally communicate the presence of the human.

In some examples, one or more light sources of an intelligent assistant device may be an infrared (IR) emitter. For example, the device may include an IR projector configured to emit encoded IR signals that are reflected from objects in the environment to be received by an IR camera of the device. In some examples, a visible glow of such an IR projector may prove annoying or distracting to a user. Accordingly, in some examples and referring briefly again to FIG. 12C, at 676 the method 600 may include, where the intelligent assistant device includes a plurality of light sources, illuminating at least one light source of the plurality of light sources to one or more of (1) reduce the visibility of at least one IR emitter, and (2) incorporate light emitted from the at least one IR emitter into an illumination pattern produced by the at least one light source. In one example, an IR emitter may be located in the middle of a plurality of LEDs on the device. The LEDs may be illuminated when the IR emitter is illuminated, such that the glow from the IR emitter blends into the light emitted from the LEDs to reduce the visibility of the IR emitter. Further, in some examples this technique also may be utilized to non-verbally communicate information to the user as described above. In another example where an IR emitter is located among a plurality of LEDs, when the IR emitter is activated the LEDs may be selectively illuminated to produce an eye-pleasing pattern that incorporates light from the IR emitter into the pattern, thereby disguising such IR light.

Figure 18:
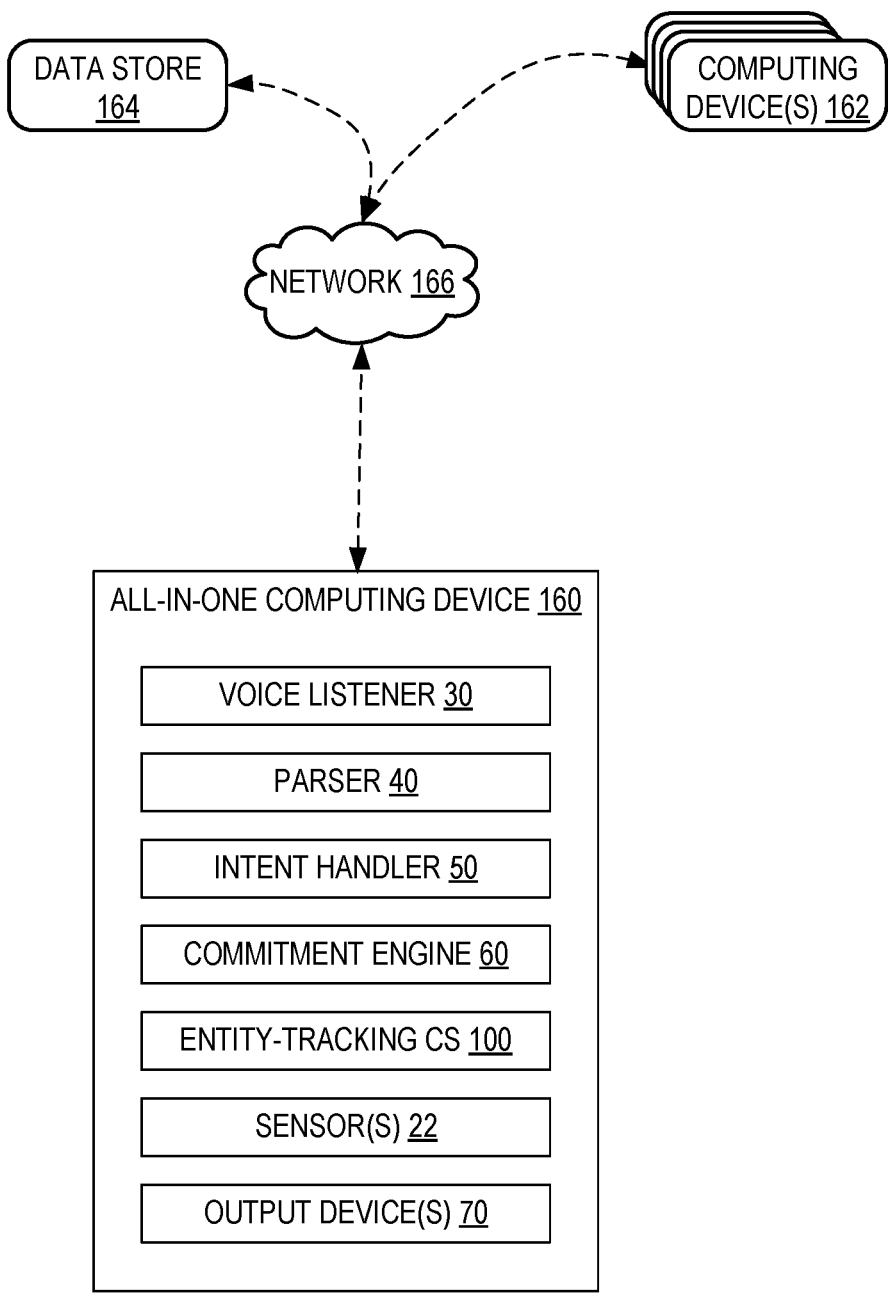
FIG. 18 schematically shows an example of an all-in-one computing device in which the components implementing intelligent assistant devices of the present disclosure are arranged together in a standalone device according to examples of the present disclosure.

With reference now to FIG. 18, an additional example implementation of intelligent assistant device 10 in a single computing device is illustrated. Additional details regarding components and computing aspects of computing devices illustrated in FIG. 18 are described below with reference to FIG. 19.

FIG. 18 shows an example of an all-in-one computing device 160 in which the components implementing intelligent assistant device 10 are arranged together in a stand-alone device. In some examples, all-in-one computing device 160 may be communicatively coupled to one or more other computing devices 162 via a network 166. In some examples, all-in-one computing device 160 may be communicatively coupled to a data store 164 that may store a variety of data, such as user profile data. All-in-one computing device 160 includes at least one sensor 22, voice listener 30, parser 40, intent handler 50, commitment engine 60, entity-tracking computing system 100, and at least one output device 70. Sensor(s) 22 include at least one camera to receive visual data and at least one microphone to receive natural language inputs from a user. In some examples one or more other types of sensor(s) 22 also may be included.

As described above, voice listener 30, parser 40, and intent handler 50 work in concert to convert natural language inputs into commitments that are executable by the all-in-one device 160. Such commitments may be stored by commitment engine 60. The entity-tracking computing system 100 may provide context information to the commitment engine 60 and/or other modules. At a contextually appropriate time, the commitment engine 60 may execute a commitment and provide output, such as audio signals, to output device(s) 70.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
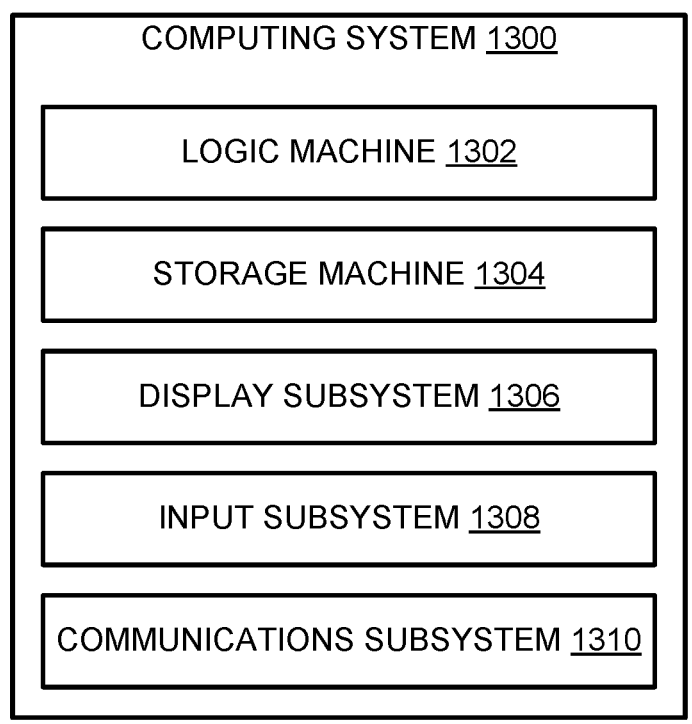
FIG. 19 schematically shows a computing system according to examples of the present disclosure.

FIG. 19 schematically shows a non-limiting embodiment of a computing system 1300 that can enact one or more of the methods and processes described above. Computing system 1300 is shown in simplified form. Computing system 1300 may take the form of one or more intelligent assistant devices as described herein, one or more personal computers, server computers, tablet computers, home-entertainment computers, network computing devices, gaming devices, mobile computing devices, mobile communication devices (e.g., smart phone), and/or other computing devices.

Computing system 1300 includes a logic machine 1302 and a storage machine 1304. Computing system 1300 may optionally include a display subsystem 1306, input subsystem 1308, communication subsystem 1310, and/or other components not shown in FIG. 19.

Logic machine 1302 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1304 includes one or more physical devices configured to hold instructions executable by the logic machine to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1304 may include volatile, nonvolatile, dynamic, static, read/write, read-only, random-access, sequential-access, location-addressable, file-addressable, and/or content-addressable devices.

It will be appreciated that storage machine 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 implemented to perform a particular function. In some cases, a module, program, or engine may be instantiated via logic machine 1302 executing instructions held by storage machine 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage machine 1304. In some examples the display subsystem 1306 may comprise one or more light sources as described herein. Where display subsystem 1306 comprises a display device that generates vector graphics and other visual representations, such representations may take the form of a graphical user interface (GUI). As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

The following paragraphs provide additional support for the claims of the subject application. One aspect provides, at an intelligent assistant device configured to respond to natural language inputs, a method for communicating non-verbal cues, the method comprising: from one or more cameras of the intelligent assistant device, receiving image data indicating presence of a human; in response to receiving the image data, actuating one or more components of the intelligent assistant device to non-verbally communicate the presence of the human; from one or more sensors of the intelligent assistant device, receiving data indicating context information of the human; using at least the data indicating context information of the human, determining one or more contexts of the human; and in response to determining the one or more contexts of the human, actuating one or more components of the intelligent assistant device to non-verbally communicate the one or more contexts of the human. The method may additionally or alternatively include, wherein actuating one or more components of the intelligent assistant device to non-verbally communicate the presence of the human further comprises illuminating at least one light source located on the intelligent assistant device. The method may additionally or alternatively include, wherein actuating one or more components of the intelligent assistant device to non-verbally communicate the presence of the human further comprises one or more of moving a camera to foveate on the human and moving a display to follow a location of the human. The method may additionally or alternatively include, wherein the one or more contexts of the human comprise one or more of (1) a location of the human with respect to the intelligent assistant device, (2) a height of the human, (3) an initial identity of the human that corresponds to a previously-identified human and represents an initial confidence value; (4) a verified identity of the human that represents a verified confidence value greater than the initial confidence value; and (5) a distance of the human from the intelligent assistant device. The method may additionally or alternatively include, wherein actuating one or more components to non-verbally communicate the one or more contexts of the human further comprises illuminating at least one light source located on the intelligent assistant device, and illuminating the at least one light source comprises modulating at least one of a frequency, a brightness, a color, a quantity, and a shape of the at least one light source. The method may additionally or alternatively include, wherein the at least one light source is a plurality of light sources, and the plurality of light sources comprises a plurality of LEDs. The method may additionally or alternatively include, wherein actuating one or more components to non-verbally communicate the one or more contexts of the human further comprises displaying vector graphics via a display of the intelligent assistant device. The method may additionally or alternatively include, wherein actuating one or more components to non-verbally communicate the one or more contexts of the human further comprises projecting the non-verbal cues onto a surface. The method may additionally or alternatively include, wherein the human is a first human, further comprising: from one or more sensors of the intelligent assistant device, receiving an indication of presence of a second human; and illuminating at least one light source located on the intelligent assistant device to non-verbally communicate that the intelligent assistant device is responsive to the natural language inputs from the first human. The method may additionally or alternatively include, wherein the human is a first human and the one or more contexts of the human comprise the location of the first human, the method further comprising: from one or more sensors of the intelligent assistant device, receiving an indication of presence of a second human; and illuminating at least one light source located on the intelligent assistant device to non-verbally communicate that the intelligent assistant device is tracking the location of the first human and a location of the second human. The method may additionally or alternatively include, wherein the one or more contexts of the human comprise the initial identity of the human, the method further comprising receiving and fusing from a plurality of different sensors of the intelligent assistant device the data indicating context information of the human to determine the initial identity of the human. The method may additionally or alternatively include, illuminating at least one light source located on the intelligent assistant device to non-verbally communicate a type of sensor data being used by the intelligent assistant device to determine the one or more contexts of the human. The method may additionally or alternatively include, wherein the one or more components comprise a plurality of light sources, and the plurality of light sources comprises at least one infrared emitter, the method further comprising illuminating at least one light source of the plurality of light sources to one or more of (1) reduce visibility of the at least one infrared emitter, and (2) incorporate light emitted from the at least one infrared emitter into an illumination pattern produced by the at least one light source.

Another aspect provides an intelligent assistant device configured to respond to natural language inputs, comprising: a plurality of light sources; a plurality of sensors comprising one or more cameras; at least one speaker; a logic machine; and a storage machine holding instructions executable by the logic machine to: from at least one camera of the one or more cameras, receive image data indicating presence of a human; in response to receiving the image data, actuate one or more components of the intelligent assistant device to non-verbally communicate the presence of the human; from one or more sensors of the plurality of sensors, receive data indicating context information of the human; using at least the data indicating context information of the human, determine one or more contexts of the human; and in response to determining the one or more contexts of the human, actuate one or more components of the intelligent assistant device to non-verbally communicate the one or more contexts of the human. The intelligent assistant device may additionally or alternatively include, wherein actuating one or more components of the intelligent assistant device to non-verbally communicate the presence of the human further comprises illuminating at least one light source of the plurality of light sources. The intelligent assistant device may additionally or alternatively include, wherein actuating one or more components of the intelligent assistant device to non-verbally communicate the presence of the human further comprises one or more of moving a camera to foveate on the human and moving a display to follow a location of the human. The intelligent assistant device may additionally or alternatively include, wherein actuating one or more components to non-verbally communicate the one or more contexts of the human further comprises illuminating at least one light source located on the intelligent assistant device, and illuminating the at least one light source comprises modulating at least one of a frequency, a brightness, a color, a quantity, and a shape of the at least one light source. The intelligent assistant device may additionally or alternatively include, wherein the human is a first human, and the instructions are executable to: from one or more sensors of the intelligent assistant device, receive an indication of presence of a second human; and illuminate at least one light source located on the intelligent assistant device to non-verbally communicate that the intelligent assistant device is responsive to the natural language inputs from the first human. The intelligent assistant device may additionally or alternatively include, wherein the human is a first human and the one or more contexts of the human comprise the location of the first human, and the instructions are executable to: from one or more sensors of the intelligent assistant device, receive an indication of presence of a second human; and illuminate at least one light source located on the intelligent assistant device to non-verbally communicate that the intelligent assistant device is tracking the location of the first human and a location of the second human.

Another aspect provides intelligent assistant device configured to respond to natural language inputs, comprising: an enclosure; a plurality of LEDs located around at least a portion of the enclosure; a plurality of sensors comprising at least one camera and at least one microphone; at least one speaker; a logic machine; and a storage machine holding instructions executable by the logic machine to: from the at least one camera, receive image data indicating presence of a human; in response to receiving the image data, illuminate at least one LED of the plurality of LEDs to non-verbally communicate detection of the presence of the human; from one or more sensors of the plurality of sensors, receive data indicating context information of the human; using at least the data indicating context information of the human, determine one or more contexts of the human; and in response to determining the one or more contexts of the human, illuminate at least one LED of the plurality of LEDs to non-verbally communicate the one or more contexts of the human.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At an intelligent assistant device configured to respond to natural language inputs, a method for communicating non-verbal cues, the method comprising:

from one or more cameras of the intelligent assistant device, receiving image data indicating presence of a human;
in response to receiving the image data, actuating one or more components of the intelligent assistant device to non-verbally communicate the presence of the human;
from one or more sensors of the intelligent assistant device, receiving data indicating context information of the human;
using at least the data indicating context information of the human, determining one or more contexts of the human, wherein the one or more contexts of the human comprise (1) an initial identity of the human that corresponds to a previously-identified human and represents an initial confidence value, and/or (2) a verified identity of the human that represents a verified confidence value greater than the initial confidence value; and
in response to determining the one or more contexts of the human, actuating one or more components of the intelligent assistant device to non-verbally communicate the one or more contexts of the human.

2. The method of claim 1, wherein actuating one or more components of the intelligent assistant device to non-verbally communicate the presence of the human further comprises illuminating at least one light source located on the intelligent assistant device.

3. The method of claim 1, wherein actuating one or more components of the intelligent assistant device to non-verbally communicate the presence of the human further comprises one or more of moving a camera to foveate on the human and moving a display to follow a location of the human.

4. The method of claim 1, wherein the one or more contexts of the human comprise at least one context selected from (1) a location of the human with respect to the intelligent assistant device, (2) a height of the human, and (3) a distance of the human from the intelligent assistant device.

5. The method of claim 1, wherein actuating one or more components to non-verbally communicate the one or more contexts of the human further comprises illuminating at least one light source located on the intelligent assistant device, and illuminating the at least one light source comprises modulating at least one of a frequency, a brightness, a color, a quantity, and a shape of the at least one light source.

6. The method of claim 5, wherein the at least one light source is a plurality of light sources, and the plurality of light sources comprises a plurality of LEDs.

7. The method of claim 1, wherein actuating one or more components to non-verbally communicate the one or more contexts of the human further comprises displaying vector graphics via a display of the intelligent assistant device.

8. The method of claim 1, wherein actuating one or more components to non-verbally communicate the one or more contexts of the human further comprises projecting the non-verbal cues onto a surface.

9. The method of claim 1, wherein the human is a first human, further comprising:
from one or more sensors of the intelligent assistant device, receiving an indication of presence of a second human; and
illuminating at least one light source located on the intelligent assistant device to non-verbally communicate that the intelligent assistant device is responsive to the natural language inputs from the first human.

10. The method of claim 1, wherein the human is a first human and the one or more contexts of the human comprise the location of the first human, the method further comprising:
from one or more sensors of the intelligent assistant device, receiving an indication of presence of a second human; and
illuminating at least one light source located on the intelligent assistant device to non-verbally communicate that the intelligent assistant device is tracking the location of the first human and a location of the second human.

11. The method of claim 1, wherein the one or more contexts of the human comprise the initial identity of the human, the method further comprising receiving and fusing from a plurality of different sensors of the intelligent assistant device the data indicating context information of the human to determine the initial identity of the human.

12. The method of claim 1, further comprising illuminating at least one light source located on the intelligent assistant device to non-verbally communicate a type of sensor data being used by the intelligent assistant device to determine the one or more contexts of the human.

13. The method of claim 1, wherein the one or more components comprise a plurality of light sources, and the plurality of light sources comprises at least one infrared emitter, the method further comprising illuminating at least one light source of the plurality of light sources to one or more of (1) reduce visibility of the at least one infrared emitter, and (2) incorporate light emitted from the at least one infrared emitter into an illumination pattern produced by the at least one light source.

14. An intelligent assistant device configured to respond to natural language inputs, comprising:
a plurality of light sources;
a plurality of sensors comprising one or more cameras;
at least one speaker;
a logic machine; and
a storage machine holding instructions executable by the logic machine to:
from at least one camera of the one or more cameras, receive image data indicating presence of a human;
in response to receiving the image data, actuate one or more components of the intelligent assistant device to non-verbally communicate the presence of the human;
from one or more sensors of the plurality of sensors, receive data indicating context information of the human;
using at least the data indicating context information of the human, determine one or more contexts of the human, wherein the one or more contexts of the human comprise (1) an initial identity of the human that corresponds to a previously-identified human and represents an initial confidence value, and/or (2) a verified identity of the human that represents a verified confidence value greater than the initial confidence value; and
in response to determining the one or more contexts of the human, actuate one or more components of the intelligent assistant device to non-verbally communicate the one or more contexts of the human.

15. The intelligent assistant device of claim 14, wherein actuating one or more components of the intelligent assistant device to non-verbally communicate the presence of the human further comprises illuminating at least one light source located on the intelligent assistant device.

16. The intelligent assistant device of claim 14, wherein actuating one or more components of the intelligent assistant device to non-verbally communicate the presence of the human further comprises one or more of moving a camera to foveate on the human and moving a display to follow a location of the human.

17. The intelligent assistant device of claim 14, wherein actuating one or more components to non-verbally communicate the one or more contexts of the human further comprises illuminating at least one light source located on the intelligent assistant device, and illuminating the at least one light source comprises modulating at least one of a frequency, a brightness, a color, a quantity, and a shape of the at least one light source.

18. The intelligent assistant device of claim 14, wherein the human is a first human, and the instructions are executable to:
from one or more sensors of the intelligent assistant device, receive an indication of presence of a second human; and
illuminate at least one light source located on the intelligent assistant device to non-verbally communicate that the intelligent assistant device is responsive to the natural language inputs from the first human.

19. The intelligent assistant device of claim 14, wherein the human is a first human and the one or more contexts of the human comprise the location of the first human, and the instructions are executable to:
from one or more sensors of the intelligent assistant device, receive an indication of presence of a second human; and
illuminate at least one light source located on the intelligent assistant device to non-verbally communicate that the intelligent assistant device is tracking the location of the first human and a location of the second human.

20. An intelligent assistant device configured to respond to natural language inputs, comprising:
an enclosure;
a plurality of LEDs located around at least a portion of the enclosure;
a plurality of sensors comprising at least one camera and at least one microphone;
at least one speaker;
a logic machine; and
a storage machine holding instructions executable by the logic machine to:
from the at least one camera, receive image data indicating presence of a human;
in response to receiving the image data, illuminate at least one LED of the plurality of LEDs to non-verbally communicate detection of the presence of the human;
from one or more sensors of the plurality of sensors, receive data indicating context information of the human;
using at least the data indicating context information of the human, determine one or more contexts of the human, wherein the one or more contexts of the human comprise (1) an initial identity of the human that corresponds to a previously-identified human and represents an initial confidence value, and/or (2) a verified identity of the human that represents a verified confidence value greater than the initial confidence value; and
in response to determining the one or more contexts of the human, illuminate at least one LED of the plurality of LEDs to non-verbally communicate the one or more contexts of the human.

* * * * *